(12) United States Patent
Lin et al.

(10) Patent No.: US 11,379,015 B2
(45) Date of Patent: *Jul. 5, 2022

(54) ELECTRONIC DEVICE

(71) Applicant: COMPAL ELECTRONICS, INC., Taipei (TW)

(72) Inventors: Che-Hsien Lin, Taipei (TW); Che-Hsien Chu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/103,952

(22) Filed: Nov. 25, 2020

(65) Prior Publication Data

US 2021/0157368 A1 May 27, 2021

Related U.S. Application Data

(60) Provisional application No. 62/940,215, filed on Nov. 25, 2019.

(51) Int. Cl.
*G06F 1/16* (2006.01)

(52) U.S. Cl.
CPC .......... *G06F 1/1681* (2013.01); *G06F 1/1677* (2013.01)

(58) Field of Classification Search
CPC .................................................... G06F 1/1681
See application file for complete search history.

(56) References Cited

U.S. PATENT DOCUMENTS

| 8,914,946 | B2* | 12/2014 | Hsu | F16H 21/44 16/366 |
| 9,274,566 | B1* | 3/2016 | Horng | G06F 1/1681 |
| 9,462,713 | B2 | 10/2016 | Hsu et al. | |
| 11,163,339 | B2* | 11/2021 | Lin | G06F 1/1681 |
| 2015/0013107 | A1* | 1/2015 | Shin | G06F 1/1641 16/366 |
| 2016/0047156 | A1* | 2/2016 | Hsu | H05K 5/0226 16/239 |
| 2016/0048175 | A1* | 2/2016 | Hsu | G06F 1/1681 16/244 |
| 2019/0163240 | A1* | 5/2019 | Lin | G06F 1/1681 |
| 2021/0191476 | A1* | 6/2021 | Lin | G06F 1/1681 |
| 2021/0200279 | A1* | 7/2021 | Lin | G06F 1/1647 |

FOREIGN PATENT DOCUMENTS

| TW | M527197 | 8/2016 |
| TW | M579314 | 6/2019 |

OTHER PUBLICATIONS

"Office Action of Taiwan Counterpart Application", dated Feb. 23, 2021, p. 1-p. 4.

* cited by examiner

*Primary Examiner* — Adrian S Wilson

(74) *Attorney, Agent, or Firm* — JCIPRNET

(57) ABSTRACT

An electronic device including a first body, a second body, a hinge structure, a first functional assembly, and a first linkage structure is provided. The first body and the second body are pivotally connected to each other by the hinge structure. The first functional assembly is movably arranged on the first body. The first linkage structure is connected between the hinge structure and the first functional assembly, wherein the first linkage structure is adapted for driving the first functional assembly to move relative to the first body with the relative rotation of the first body and the second body.

14 Claims, 20 Drawing Sheets

ELECTRONIC DEVICE

CROSS-REFERENCE TO RELATED APPLICATION

This application claims the priority benefit of U.S. provisional application Ser. No. 62/940,215, filed on Nov. 25, 2019. The entirety of the above-mentioned patent application is hereby incorporated by reference herein and made a part of this specification.

BACKGROUND

Technical Field

The disclosure relates to an electronic device, and in particular to an electronic device with a movable functional assembly.

Description of Related Art

Dual screen electronic devices such as smart phones, tablets, and notebooks have already been developed. The dual screen is used to expand a screen display range and may serve as a replacement for a physical keyboard, thereby reducing the thickness of the electronic devices. In a dual screen electronic device, the two screens are adapted to be expanded or folded relative to each other. In the expanded state, the two screens may output images synchronously or separately. In the folded state, the two screens are stacked one above the other, which may reduce the volume of the electronic device for convenient storage.

In most of the existing dual screen electronic devices, a hinge structure is installed between the two screens, which allows the two screens to be flipped relative to the hinge structure. However, when the two screens of the dual screen electronic devices are expanded relative to each other, a gap is formed between the two screens, such that the two screens fail to display continuous images, and the image display effect is affected adversely.

SUMMARY

The disclosure provides an electronic device which includes a linkage structure, the linkage structure enabling a functional assembly to move relative to a corresponding body.

The electronic device of the disclosure includes a first body, a second body, a hinge structure, a first functional assembly, and a first linkage structure. The first body and the second body are pivotally connected to each other by the hinge structure. The first functional assembly is movably arranged on the first body. The first linkage structure is connected between the hinge structure and the first functional assembly, in which the first linkage structure is adapted for driving the first functional assembly to move relative to the first body with a relative rotation of the first body and the second body.

In an embodiment of the disclosure, the first linkage structure includes a sliding unit and a guidance part, and the sliding unit is fixed to the first functional assembly and is adapted for being slidably installed on the guidance part. The guidance part has a first inclined segment. The first inclined segment has a first end and a second end opposite to each other, and the second end is closer to the hinge structure than the first end. In a process of the sliding unit sliding along the first inclined segment from the first end thereof toward the second end thereof, the sliding unit drives the first functional assembly to slide and ascend relative to the first body.

In an embodiment of the disclosure, the guidance part has a second inclined segment. The second inclined segment has a third end and a fourth end opposite to each other, and the fourth end is closer to the hinge structure than the third end. In a process of the sliding unit sliding along the second inclined segment from the third end thereof toward the fourth end thereof, the sliding unit drives the first functional assembly to slide and descend relative to the first body.

In an embodiment of the disclosure, the guidance part has a horizontal segment. The horizontal segment is connected between the second end and the third end, and is parallel to a display surface of the first functional assembly. In a process of the sliding unit sliding along the horizontal segment, the sliding unit drives the first functional assembly to slip horizontally relative to the first body.

In an embodiment of the disclosure, the first inclined segment and the second inclined segment are symmetrically arranged at two ends of the horizontal segment.

In an embodiment of the disclosure, in the processes of the sliding unit sliding along the first inclined segment, the horizontal segment, and the second inclined segment, the first functional assembly moves close to or away from the hinge structure in a first direction perpendicular to an axis direction of the hinge structure and parallel to the display surface of the first functional assembly, and ascends or descends relative to the first body in a second direction perpendicular to the first direction and perpendicular to the display surface of the first functional assembly.

In an embodiment of the disclosure, the first inclined segment and the second inclined segment are of the same length in the second direction.

In an embodiment of the disclosure, the first functional assembly has a front end and a rear end opposite to each other. When the first body is folded relative to the second body, a distance between the rear end and the hinge structure is less than a distance between the front end and the hinge structure. The first linkage structure corresponds to the rear end. With the relative rotation of the first body and the second body, the rear end is adapted for forming an angle with respect to the first body.

In an embodiment of the disclosure, the first body includes a guidance structure therein. The guidance structure has an inclined segment and corresponds to a front end of the first functional assembly. The first linkage structure corresponds to a rear end of the first functional assembly. The first linkage structure and the guidance structure are adapted for driving the first functional assembly to remain horizontal with the first body while moving with the relative rotation of the first body and the second body.

In an embodiment of the disclosure, the hinge structure includes a first shaft and a second shaft. The first shaft is connected to the first body and has a guidance slot. The second shaft is connected to the second body. The first linkage structure is adapted for being driven by the guidance slot.

In an embodiment of the disclosure, the first linkage structure includes a convex part slidably installed in the guidance slot. When the first body is expanded relative to the second body at an expansion angle smaller than a predetermined angle, the guidance slot does not push against the convex part; when the first body is expanded relative to the second body at an expansion angle not smaller than the predetermined angle, the guidance slot pushes against the convex part to be adapted for driving the sliding unit to slide in the guidance part.

In an embodiment of the disclosure, the electronic device further includes a second functional assembly and a second linkage structure. The second functional assembly is movably arranged on the second body. The second linkage structure is connected between the hinge structure and the second functional assembly, in which the second linkage structure is adapted for driving the second functional assembly to move relative to the second body with the relative rotation of the first body and the second body, such that the first functional assembly and the second functional assembly abut each other.

In an embodiment of the disclosure, when the first body and the second body are folded relative to each other, the first functional assembly and the second functional assembly are adapted for being stacked in a parallel manner to form an accommodating space between the first functional assembly and the second functional assembly. The accommodating space selectively accommodates an external device.

In an embodiment of the disclosure, the guidance part has an outer side away from the first functional assembly. The electronic device further includes a flexible unit arranged on the outer side of the guidance part.

In an embodiment of the disclosure, the first inclined segment and the second inclined segment respectively have a first height and a second height in the second direction, in which the first height is greater than the second height.

Based on the above, the electronic device of the disclosure includes the movable first functional assembly, in which the first functional assembly may move relative to the first body. When the first body and the second body are expanded relative to each other, the first linkage structure may drive the first functional assembly to slide and ascend or slide and descend relative to the first body.

In order to make the aforementioned features and advantages of the disclosure comprehensible, embodiments accompanied with drawings are described in detail below.

DESCRIPTION OF THE EMBODIMENTS

Figure 1:
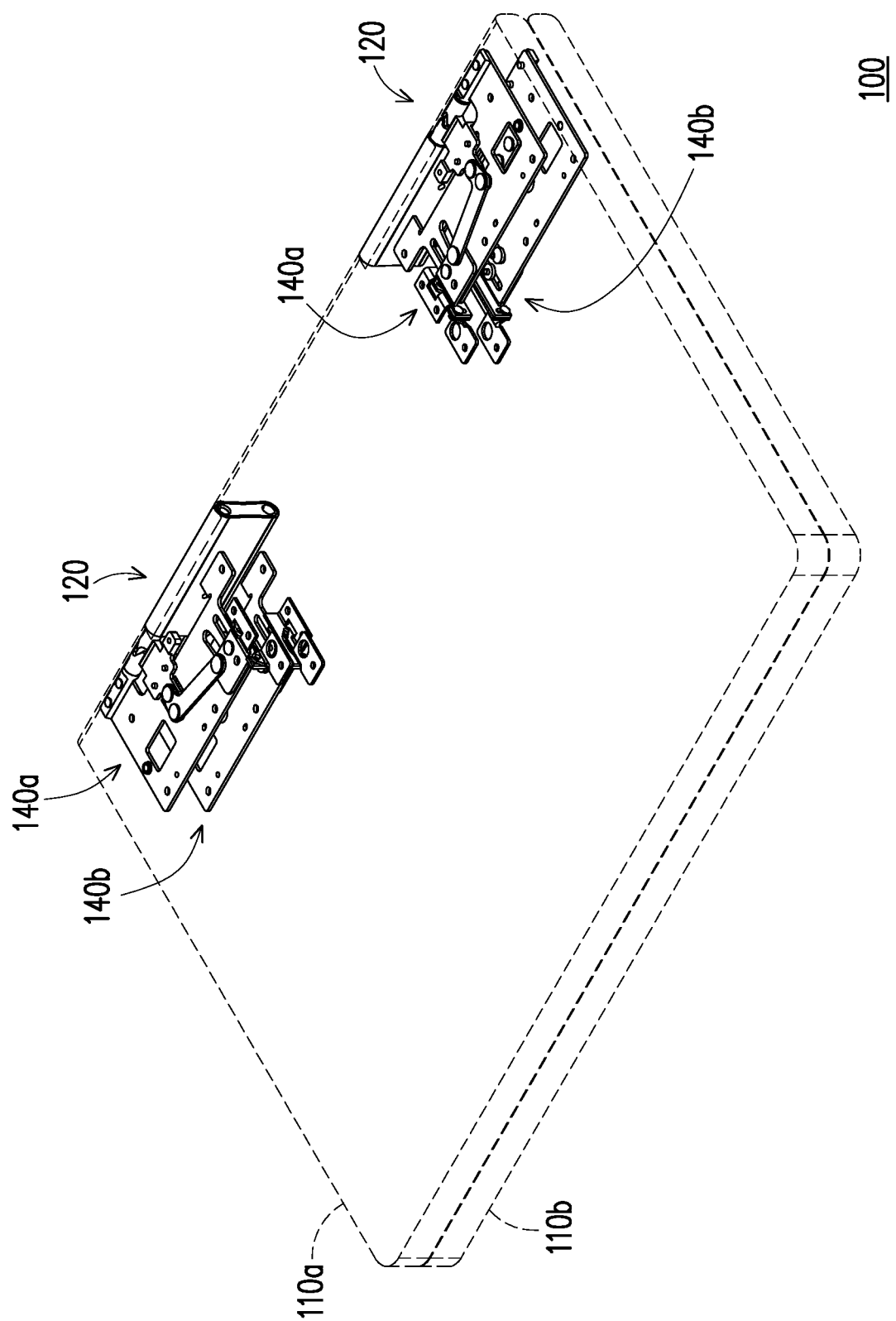
FIG. 1 is a perspective view of an electronic device according to an embodiment of the disclosure.

FIG. 1 is a perspective view of an electronic device according to an embodiment of the disclosure. Referring to FIG. 1, an electronic device 100 of this embodiment includes a first body 110a, a second body 110b, at least one hinge structure 120 (two are depicted), and at least one first linkage structure 140a (two are depicted). The first body 110a and the second body 110b are pivotally connected to each other by the hinge structure 120.

Figure 2A:
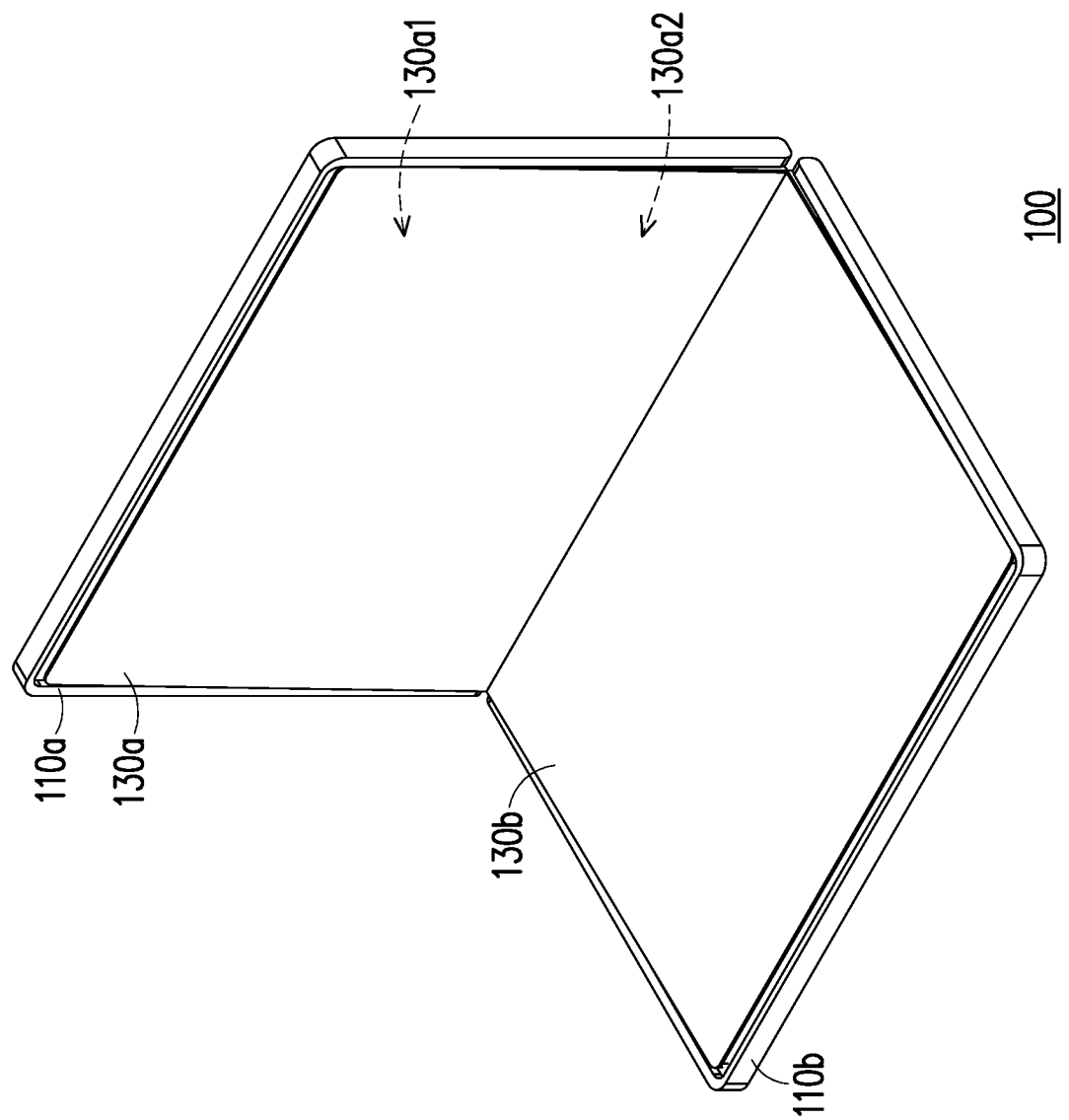
FIGS. 2A to 2C depict two bodies of FIG. 1 flipping relative to each other.
Figure 2B:
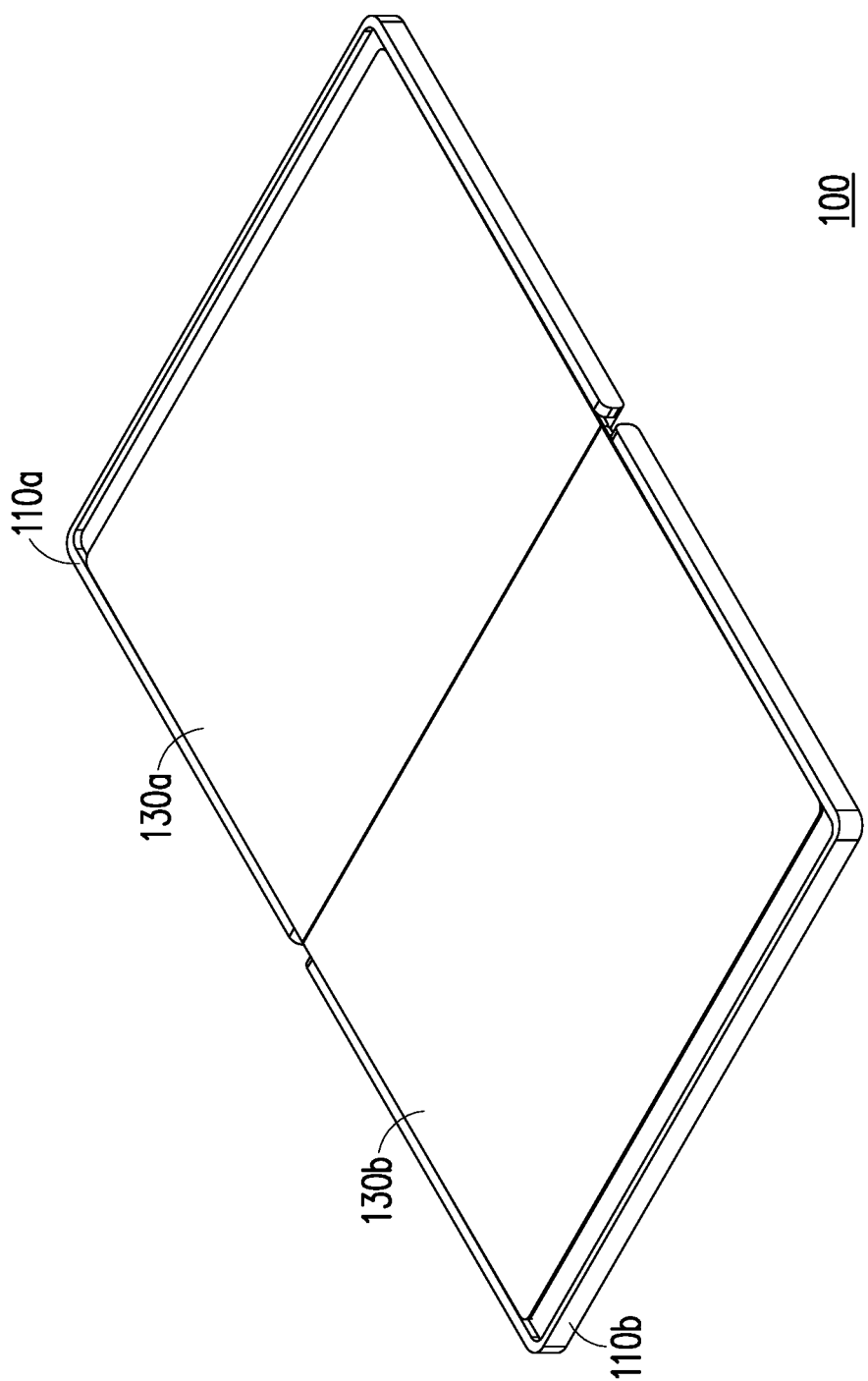
Figure 2C:
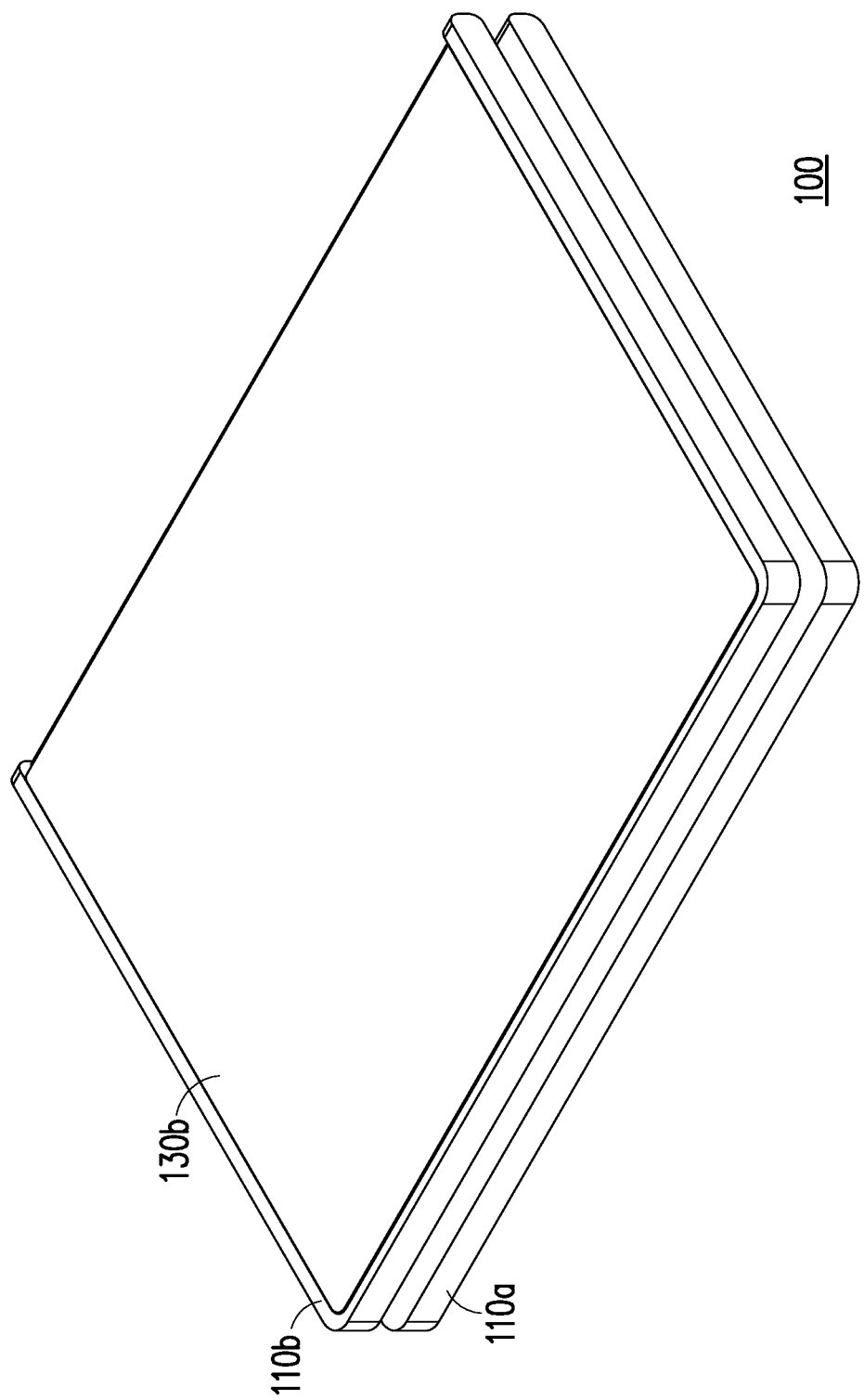

FIGS. 2A to 2C depict two bodies of FIG. 1 flipping relative to each other. The electronic device 100 further includes a first functional assembly 130a. The first functional assembly 130a is movably arranged on the first body 110a. Specifically, the first linkage structure 140a is connected between the hinge structure 120 and the first functional assembly 130a, in which the first linkage structure 140 may drive the first functional assembly 130a to move relative to the first body 110a with a relative rotation of the first body 110a and the second body 110b.

In this embodiment, through pivoting of the hinge structure 120, the first body 110a and the second body 110b may flip relative to each other from a folded state as shown in FIG. 1 to an expanded state as shown in FIG. 2A, from the expanded state as shown in FIG. 2A to a flattened state shown in FIG. 2B, and from the flattened state as shown in FIG. 2B to a reversely folded state as shown in FIG. 2C.

As mentioned above, when the first body 110a and the second body 110b are expanded relative to each other, the first linkage structure 140 may drive the first functional assembly 130a to slide and ascend relative to the first body 110a and to move close to a second functional assembly 130b arranged on the second body 110b, so as to reduce a gap between the first functional assembly 130a and the second functional assembly 130b. The first functional assembly 130a and the second functional assembly 130b are, for example, display panels which thus provide a continuous display effect. In addition, the first functional assembly 130a may cover the hinge structure 120, thereby improving the appearance of the electronic device 100. In other embodiments, the first functional assembly 130a and the second functional assembly 130b may be an output device (such as a display panel) and an input device (such as a keyboard or a touch pad), respectively, or may be other kinds of assemblies respectively. The disclosure is not limited thereto. In other words, the first functional assembly and the second functional assembly in the disclosure may be the same or different assemblies. For example, the first functional assembly and the second functional assembly may each be or include, a display panel, a touch display panel, a keyboard, a touch pad, a speaker, a combination of a keyboard and a touch pad, a combination of a display and an input device, etc. The disclosure is not limited thereto. In addition, the first functional assembly may be electrically connected to at least one of the first body and the second body and the electrical connection may be wired or wireless; the second functional assembly may be electrically connected to at least one of the first body and the second body and the electrical connection may be wired or wireless.

The electronic device 100 of this embodiment further includes at least one second linkage structure 140b (two are depicted in FIG. 1). The second linkage structure 140b is connected between the hinge structure 120 and the second functional assembly 130b, in which the second linkage structure 140b may drive the second functional assembly 130b to move relative to the second body 110b with the relative rotation of the first body 110a and the second body 110b. In this embodiment, the first functional assembly 130a and the second functional assembly 130b move synchronously through the first linkage structure 140a and the second linkage structure 140b and abut each other. In other embodiments, the first functional assembly 130a and the second functional assembly 130b may, for example, move to a specific position, or may move asynchronously. Alternatively, only a single body may include a linkage structure so that only a single functional assembly is moved. The disclosure is not limited thereto.

The following describes a manner in which a linkage structure drives a functional assembly to slide and ascend relative to a body. Since the first linkage structure 140a and the second linkage structure 140b are substantially the same, only the first linkage structure 140a will be described below as an example.

Figure 3:
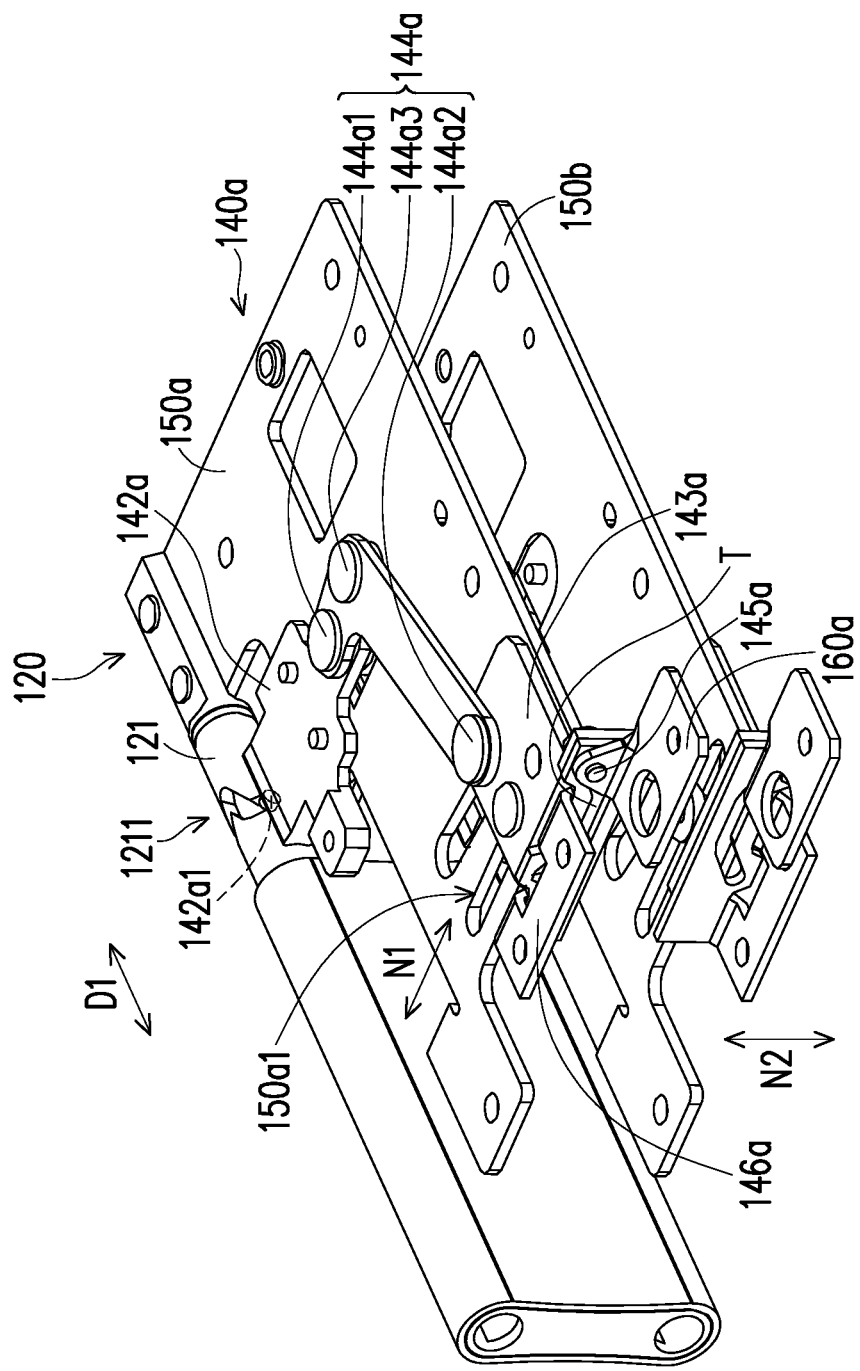
FIG. 3 is a perspective view of a linkage structure and a hinge structure of FIG. 1.
Figure 4:
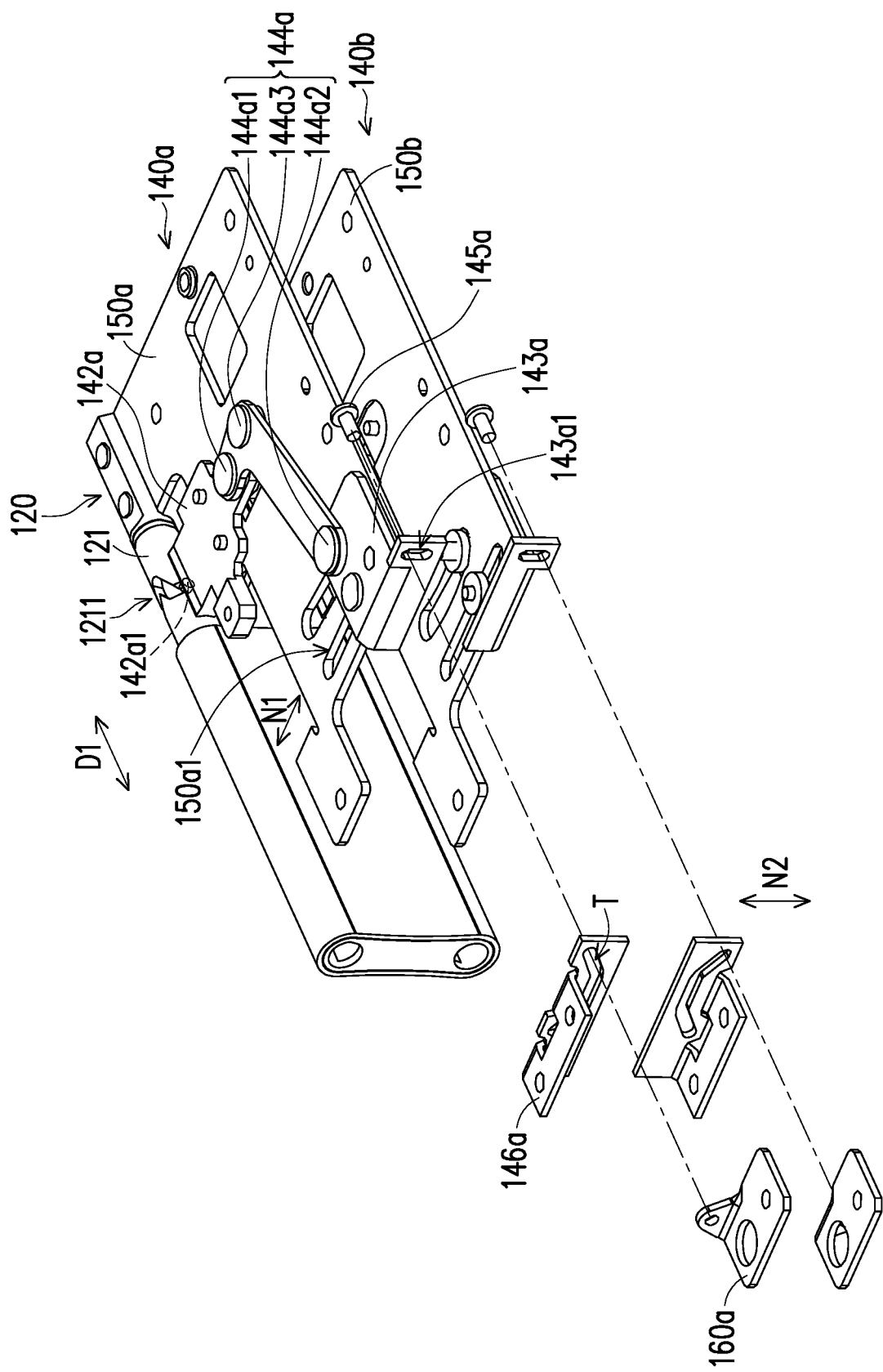
FIG. 4 is an exploded view of the linkage structure and the hinge structure of FIG. 1.
Figure 5:
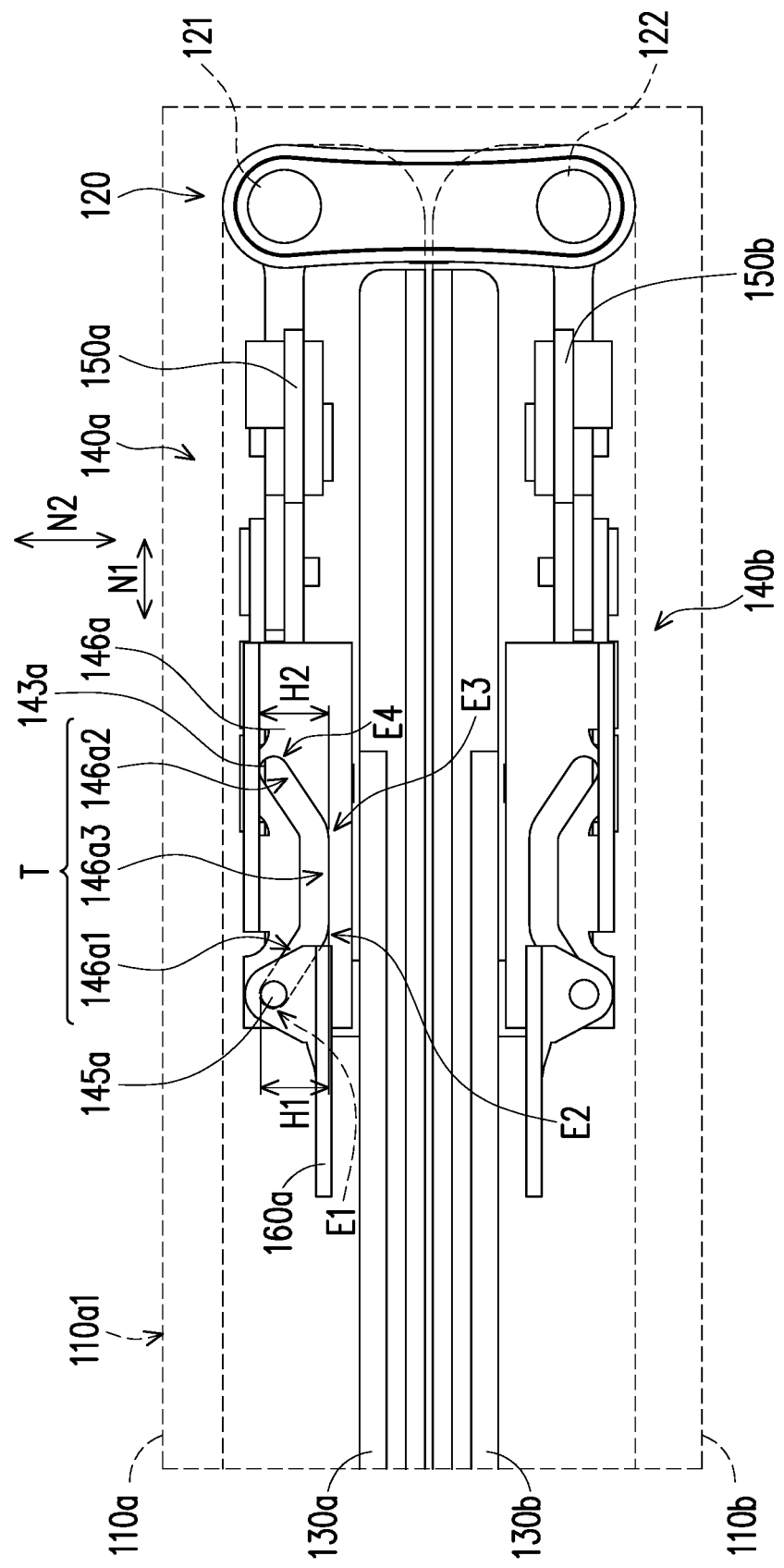
FIG. 5 is a side view of the electronic device of FIG. 1.

FIG. 3 is a perspective view of a linkage structure and a hinge structure of FIG. 1. FIG. 4 is an exploded view of the linkage structure and the hinge structure of FIG. 1. FIG. 5 is a side view of the electronic device of FIG. 1. It should be noted that one of the two first linkage structures 140a and one of the two second linkage structures 140b are omitted in FIG. 5 to illustrate the internal structure of the electronic device 100 more clearly. In this embodiment, the hinge structure 120, for example, has dual shafts. The hinge structure 120 includes a first shaft 121 and a second shaft 122. The electronic device 100 further includes a first frame body 150a. The first frame body 150a fixes the first body 110a and is connected to the first shaft 121. The first shaft 121 is connected to the first body 110a through the first frame body 150a. The second shaft 122 is connected to the second body 110b through a frame body 150b. The first body 110a and the second body 110b may be expanded or folded through relative pivoting of the first shaft 121 and the second shaft 122.

The first linkage structure 140a of this embodiment includes a sliding block 142a and a second frame body 143a. The sliding block 142a is slidably installed on the first frame body 150a in an axis direction D1 of the hinge structure 120. The second frame body 143a is slidably installed in a sliding slot 150a1 of the first frame body 150a in a first direction N1 perpendicular to the axis direction D1 and parallel to a display surface of the first functional assembly 130a. The second frame body 143a is connected to the first functional assembly 130a by, for example but not limited to, locking. The hinge structure 120 is adapted for driving the corresponding second frame body 143a to slide relative to the first frame body 150a in the first direction N1 with the relative rotation of the first body 110a and the second body 110b, so that the second frame body 143a drives the first functional assembly 130a to slip relative to the first body 110a in the first direction N1.

The first linkage structure 140a of this embodiment further includes a connecting rod 144a. The connecting rod 144a has a first sliding end 144a1 connected to the sliding block 142a, a second sliding end 144a2 connected to the second frame body 143a, and a hinge end 144a3 located between the first sliding end 144a1 and the second sliding end 144a2. The first sliding end 144a1 and the second sliding end 144a2 are slidably connected to the first frame body 150a, and the hinge end 144a3 is pivotally connected to the first frame body 150a.

The first shaft 121 of this embodiment has a guidance slot 1211. The first linkage structure 140a may be driven by the guidance slot 1211. Specifically, the sliding block 142a has a convex part 142a1 slidably installed in the guidance slot 1211. When the first body 110a is expanded relative to the second body 110b at an extension angle smaller than a predetermined angle (20 degrees, for example), the guidance slot 1211 does not push against the convex part 142a1. When the first body 110a is expanded relative to the second body 110b at an extension angle not smaller than the predetermined angle, the guidance slot 1211 pushes against the convex part 142a1. At this time, the guidance slot 1211 drives the sliding block 142a and the first sliding end 144a1 to slide in the axis direction D1 of the hinge structure 120 and drives the second sliding end 144a2. The second sliding end 144a2 drives the second frame body 143a to slide in the first direction N1. The first functional assembly 130a connected to the second frame body 143a may thereby slip relative to the first body 110a in the first direction N1.

In this embodiment, the guidance slot 1211 includes an obliquely extending segment and may guide the convex part 142a1 with rotation of the first linkage structure 140a relative to the first shaft 121, such that the sliding block 142a slides in the axis direction D1 of the first shaft 121. In other embodiments, by changing the extension manner of the guidance slot 1211, the timing of slipping of the first functional assembly 130a may be changed accordingly. The disclosure is not limited thereto. In addition, in other embodiments, the sliding of the sliding block 142a may be guided by other suitable structures. The disclosure is not limited thereto. In addition, in other embodiments, the second frame body 143a may be driven by other suitable linkage assemblies. The disclosure is not limited thereto.

Specifically, the first linkage structure 140a includes a sliding unit 145a, a guidance part 146a, and a third frame body 160a. The sliding unit 145a is fixed to the first functional assembly 130a and slidably installed in a crossing slot T of the guidance part 146a. The sliding unit 145a herein is, for example but not limited to, a bolt.

The third frame body 160a of this embodiment is slidably installed, through the sliding unit 145a, in a sliding slot 143a1 of the second frame body 143a in a second direction N2 perpendicular to the first direction N1 and perpendicular to the display surface of the first functional assembly 130a. The first functional assembly 130a is fixed to the third frame body 160a by, for example but not limited to, locking. The guidance part 146a corresponds to the third frame body 160a. Besides being slidably installed in the sliding slot 143a1 of the second frame body 143a through the sliding unit 145a as described above, the third frame body 160a is connected to the guidance part 146a through the sliding unit 145a.

Referring to FIG. 5, the crossing slot T includes a first inclined segment 146a1, a second inclined segment 146a2, and a horizontal segment 146a3. The first inclined segment 146a1, the horizontal segment 146a3, and the second inclined segment 146a2 are sequentially connected to each other in the first direction N1. When the third frame body 160a slides with the second frame body 143a in the first direction N1, the third frame body 160a is guided and driven by the crossing slot T to slide in the second direction N2, so as to drive the first functional assembly 130a to ascend or descend relative to the first body 110a in the second direction N2.

The first inclined segment 146a1 of this embodiment has a first end E1 and a second end E2 opposite to each other. Compared to the first end E1, the second end E2 is closer to the hinge structure 120 and farther from an outer surface 110a1 of the first body 110a. In the process of the sliding unit 145a sliding along the first inclined segment 146a1 from the first end E1 toward the second end E2, the sliding unit 145a drives the first functional assembly 130a to ascend relative to the first body 110a (that is, to move away from the outer surface 110a1 of the first body 110a).

The second inclined segment 146a2 of this embodiment has a third end E3 and a fourth end E4 opposite to each other. Compared to the third end E3, the fourth end E4 is closer to the hinge structure 120 and closer to the outer surface 110a1 of the first body 110a. In the process of the sliding unit 145a sliding along the second inclined segment 146a2 from the third end E3 toward the fourth end E4, the sliding unit 145a drives the first functional assembly 130a to descend relative to the first body 110a (that is, to move close to the outer surface 110a1 of the first body 110a).

The horizontal segment 146a3 of this embodiment is connected between the second end E2 and the third end E3 and is parallel to the display surface of the first functional assembly 130a. The first inclined segment 146a1 and the second inclined segment 146a2 are symmetrically arranged at two ends of the horizontal segment 146a3. In the process of the sliding unit 145a sliding along the horizontal segment 146a3, the sliding unit 145a drives the first functional assembly 130a to slip horizontally relative to the first body 110a. In other embodiments, the first inclined segment 146a1 and the second inclined segment 146a2 may be designed to have different inclination degrees. The disclosure is not limited thereto.

In the above configuration, the hinge structure 120 may drive the sliding unit 145a of the first linkage structure 140a to slide in the crossing slot T, such that the first functional assembly 130a moves close to or away from the hinge structure 120 in the first direction N1 and ascends or descends relative to the first body 110a in the second direction N2.

In this embodiment, a length H1 of the first inclined segment 146a1 in the second direction N2 is equal to a length H2 of the second inclined segment 146a2 in the second direction N2, and thus, a height of movement of the first functional assembly 130a is constant in the second direction N2. In this embodiment, the crossing slot T is formed by the first inclined segment 146a1, the second inclined segment 146a2, and the horizontal segment 146a3. In other embodiments, by changing the extension manner of the crossing slot T, the timing and height of ascending and descending of the first functional assembly 130a may be changed accordingly. The disclosure is not limited thereto.

Figure 6A:
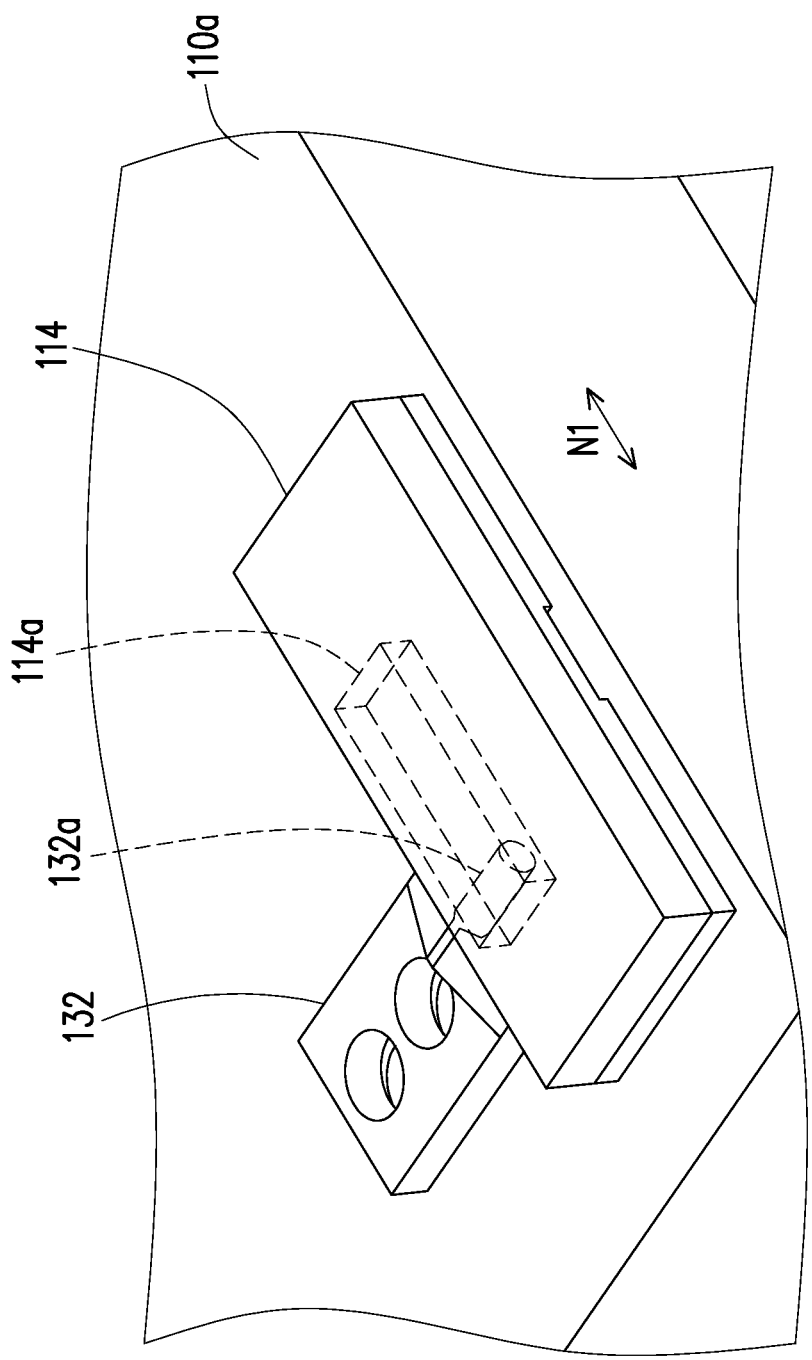
FIG. 6A depicts a manner in which a front end of a functional assembly of FIG. 2A is connected to a body.

FIG. 6A depicts a manner in which a front end of a functional assembly of FIG. 2A is connected to a body. FIG. 6A corresponds to a position 130a1 shown in FIG. 2A, and FIG. 3 corresponds to a position 130a2 shown in FIG. 2A. When the first body 110a is folded relative to the second body 110b, a distance between the rear end (the position 130a2 shown in FIG. 2A) and the hinge structure 120 is less than a distance between the front end (the position 130a1 shown in FIG. 2A) and the hinge structure 120.

In this embodiment, the first linkage structure 140a corresponds to the rear end (the position 130a2 shown in FIG. 2A), and a front end (the position 130a1 shown in FIG. 2A) of the first body 110a may have a guidance structure 114 as shown in FIG. 6A. The guidance structure 114 is a linear guidance slot with a horizontal segment, and an extending direction of the linear guidance slot is parallel to the display surface of the first functional assembly 130a (not depicted in FIG. 6A). The first functional assembly 130a (not depicted in FIG. 6A) is slidably installed in a guidance slot 114a of the guidance structure 114 through a bolt 132a of a connecting unit 132.

With the relative rotation of the first body 110a and the second body 110b, the first linkage structure 140a is adapted for driving the rear end (the position 130a2 shown in FIG. 2A) to ascend. The front end (the position 130a1 shown in FIG. 2A) of the first functional assembly 130a (not depicted in FIG. 6A) may be guided and driven by the guidance slot 114a to slide in the first direction N1 as described above. At this time, the front end (the position 130a1 shown in FIG. 2A) of the first functional assembly 130a (not depicted in FIG. 6A) may be translated and rotatably connected to the first body 110a through the bolt 132a of the connecting unit 132, so that the entire first functional assembly 130a (not depicted in FIG. 6A) is adapted for moving with the ascending and descending of the corresponding third frame body 160a (depicted in FIG. 8), and the rear end (the position 130a2 shown in FIG. 2A) ascends relative to the front end (the position 130a1 shown in FIG. 2A), so that the first functional assembly 130a (not depicted in FIG. 6A) is inclined relative to the corresponding first body 110a, and forms an angle of, for example, 1 degree to 5 degrees, with respect to the first body 110a. The disclosure is not limited thereto. In other embodiments, other guidance structures may be used to replace the guidance structure 114 of FIG. 6A such that the first functional assembly 130a can be operated in different manners, examples of which are given along with accompany drawings as follows.

Figure 6B:
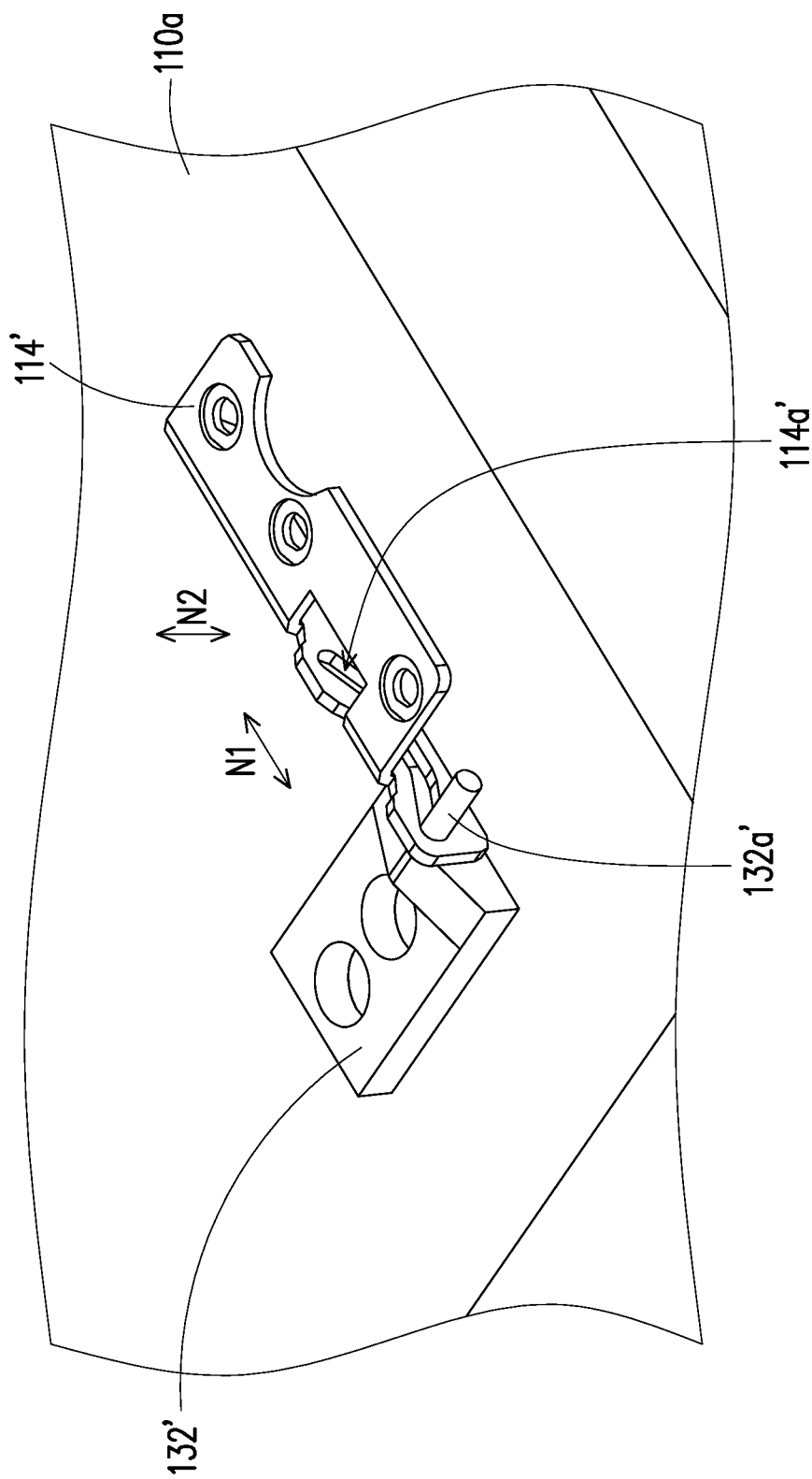
FIG. 6B depicts a manner in which a front end of a functional assembly is connected to a body according to another embodiment of the disclosure.

FIG. 6B depicts a manner in which the front end of the functional assembly is connected to a body according to another embodiment of the disclosure. The embodiment as shown in FIG. 6B is different from the embodiment as shown in FIG. 6A in that a guidance slot 114a' of a guidance structure 114' has an inclined segment. Specifically, an extending direction of the guidance slot 114a' is the same as an extending direction of the crossing slot T (depicted in FIG. 5). The first functional assembly 130a (not depicted in FIG. 6B) is slidably installed in the guidance slot 114a' of the guidance structure 114' through a bolt 132a' of a connecting unit 132', such that the front end (the position 130a1 shown in FIG. 2A) is guided and driven by the inclined segment of the guidance slot 114a' to ascend and descend in the second direction N2 as described above. Therefore, the first linkage structure 140a and the guidance structure 114' are adapted for driving the entire first functional assembly 130a with the relative rotation of the first body 110a and the second body 110b, which allows the display surface of the first functional assembly 130a to remain horizontal with the first body 110a during movement.

Figure 7A:
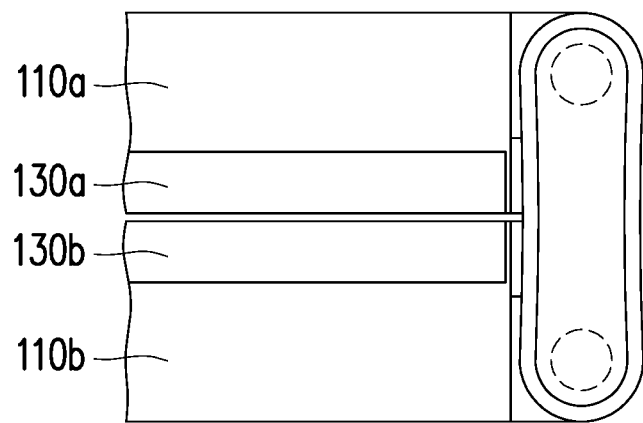
FIGS. 7A to 7G are schematic views of a flipping process of the electronic device of FIG. 1.
Figure 7B:
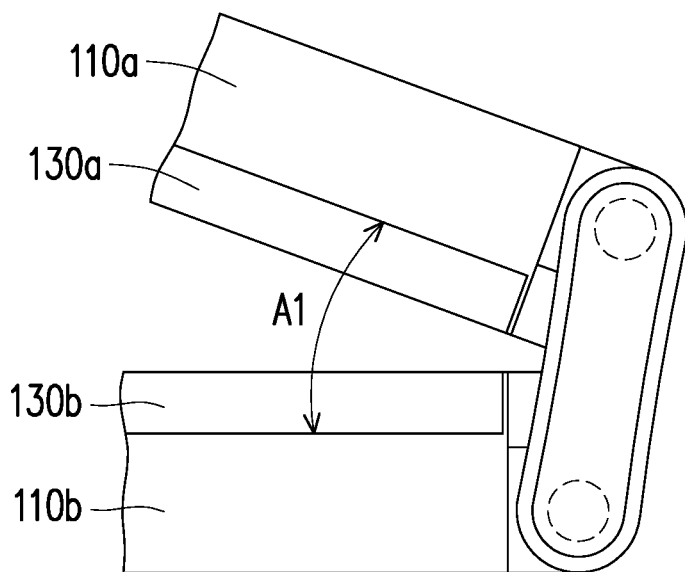

FIGS. 7A to 7G are schematic views of a flipping process of the electronic device of FIG. 1. For example, when the first body 110a and the second body 110b are expanded relative to each other from a folded state as shown in FIG. 7A to a state as shown in FIG. 7B and have a first expansion angle A1 (20 degrees, for example), the first linkage structure 140a and the second linkage structure 140b (depicted in FIG. 1) do not drive the first functional assembly 130a and the second functional assembly 130b to move relative to the first body 110a and the second body 110b.

Figure 7C:
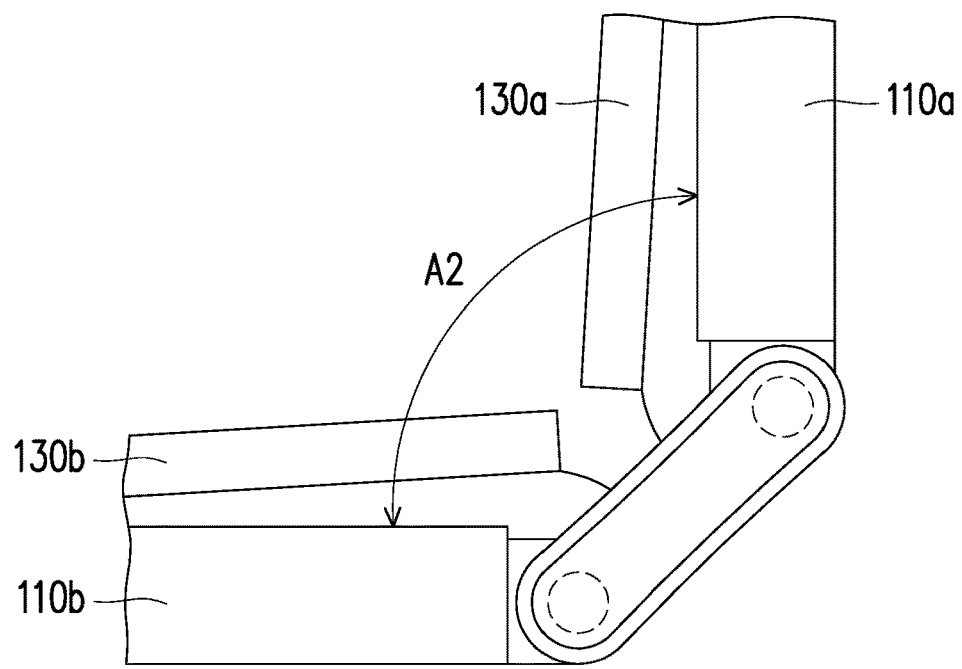

When the first body 110a and the second body 110b with the first expansion angle A1 continue to be expanded relative to each other from the state as shown in FIG. 7B to a state as shown in FIG. 7C and have a second expansion angle A2 (90 degrees, for example), the first linkage structure 140a and the second linkage structure 140b (depicted in FIG. 1) drive the first functional assembly 130a and the second functional assembly 130b to ascend and slip relative to the first body 110a and the second body 110b, and the first functional assembly 130a and the second functional assembly 130b are inclined relative to the first body 110a and the second body 110b so that edges of the first functional assembly 130a and the second functional assembly 130b move close to each other.

Figure 7D:
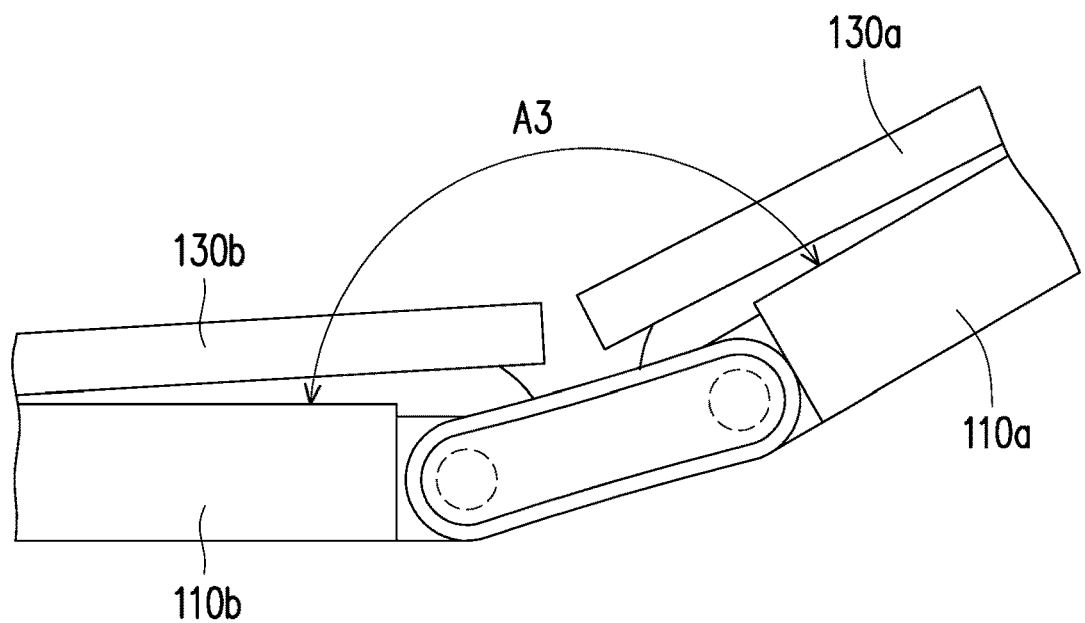

When the first body 110a and the second body 110b with the second expansion angle A2 continue to be expanded relative to each other from the state as shown in FIG. 7C to a state as shown in FIG. 7D and have a third expansion angle A3 (150 degrees, for example), the first linkage structure 140a and the second linkage structure 140b (depicted in FIG. 1) drive the first functional assembly 130a and the second functional assembly 130b to slip relative to the first body 110a and the second body 110b so that the edges of the first functional assembly 130a and the second functional assembly 130b move close to each other.

Figure 7E:
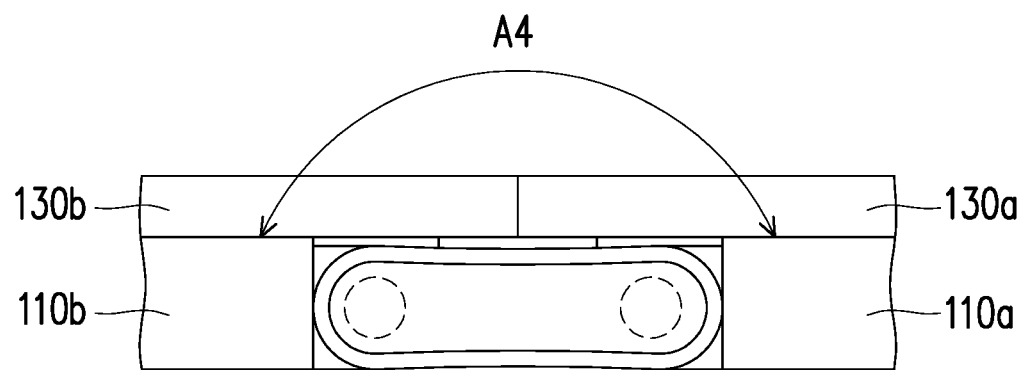

When the first body 110a and the second body 110b with the third expansion angle A3 continue to be expanded relative to each other from the state as shown in FIG. 7D to a state as shown in FIG. 7E and have a fourth expansion angle A4 (180 degrees, for example), the first linkage structure 140a and the second linkage structure 140b (depicted in FIG. 1) drive the first functional assembly 130a and the second functional assembly 130b to descend and slip relative to the first body 110a and the second body 110b so that the edges of the first functional assembly 130a and the second functional assembly 130b abut each other.

Figure 7F:
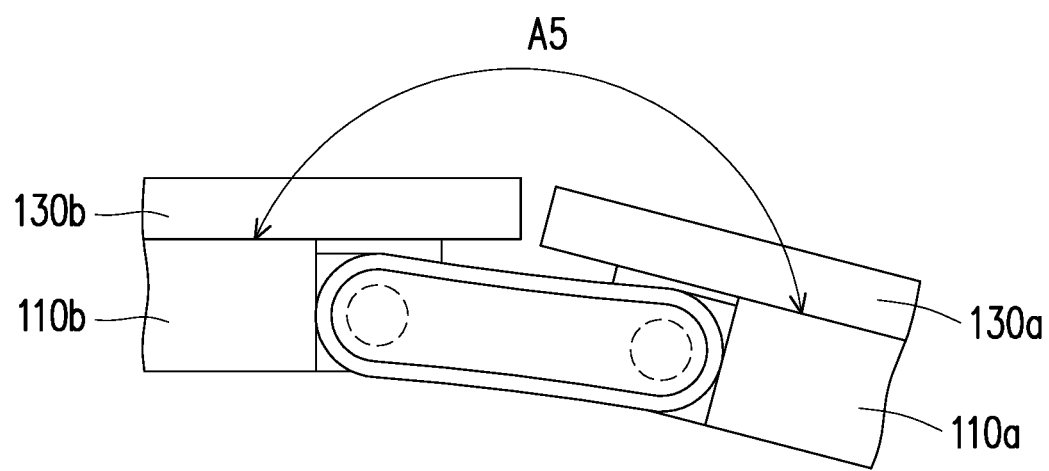

When the first body 110a and the second body 110b with the fourth expansion angle A4 continue to be expanded relative to each other from the state as shown in FIG. 7E to a state as shown in FIG. 7F and have a fifth expansion angle A5 (210 degrees, for example), the first linkage structure 140a and the second linkage structure 140b (depicted in FIG. 1) drive the first functional assembly 130a and the second functional assembly 130b to translate relative to the first body 110a and the second body 110b so that the edges of the first functional assembly 130a and the second functional assembly 130b are separated from each other.

Figure 7G:
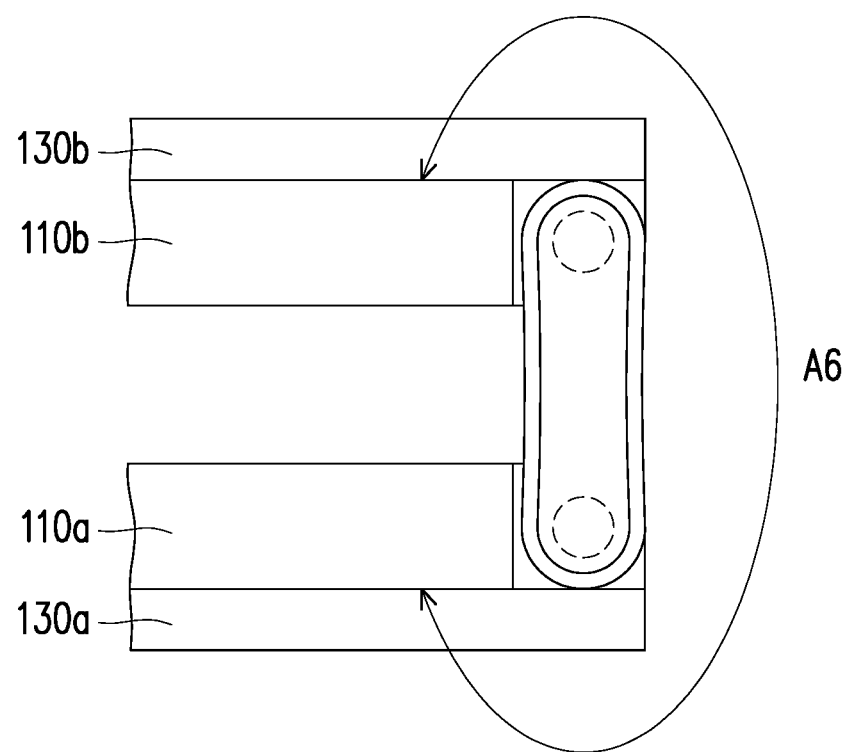

When the first body 110a and the second body 110b with the fifth expansion angle A5 continue to be expanded relative to each other from the state as shown in FIG. 7F to a state as shown in FIG. 7G and have a sixth expansion angle A6 (360 degrees, for example), the first linkage structure 140a and the second linkage structure 140b (depicted in FIG. 1) do not drive the first functional assembly 130a and the second functional assembly 130b to move relative to the first body 110a and the second body 110b.

When the first body 110a and the second body 110b with the sixth expansion angle A6 are folded relative to each other from the state as shown in FIG. 7G to the state as shown in FIG. 7A, the first functional assembly 130a and the second functional assembly 130b are guided by the crossing slot T to slip and are restored to their original positions. By designing the shape of the crossing slot T, the timing and height of ascending and descending of the first functional assembly 130a and the second functional assembly 130b may be changed accordingly. In other embodiments, the first functional assembly 130a and the second functional assembly 130b may, for example, move to a specific position, or may asynchronously move and be restored to their original positions. Alternatively, only a single body may include a linkage structure so that only a single functional assembly is moved and restored to its original position. The disclosure is not limited thereto.

It should be noted that the operation process as shown in FIGS. 7A to 7G are only for illustration purposes, and the disclosure does not limit the timing of ascending and translation of each of the first functional assembly 130a and the second functional assembly 130b. Another operation process is described as follows.

Figure 8A:
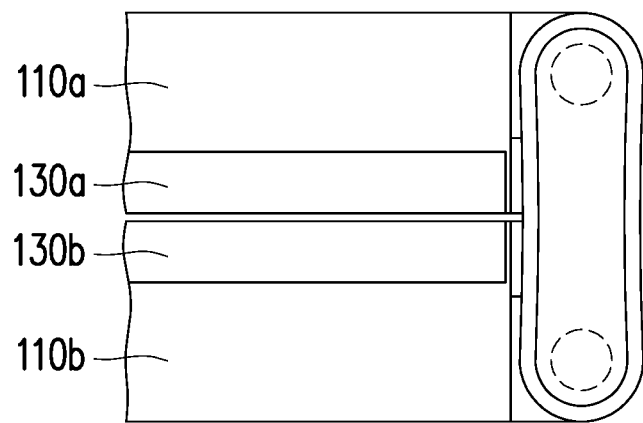
FIGS. 8A to 8G are schematic views of a flipping process of an electronic device according to another embodiment of the disclosure.
Figure 8B:
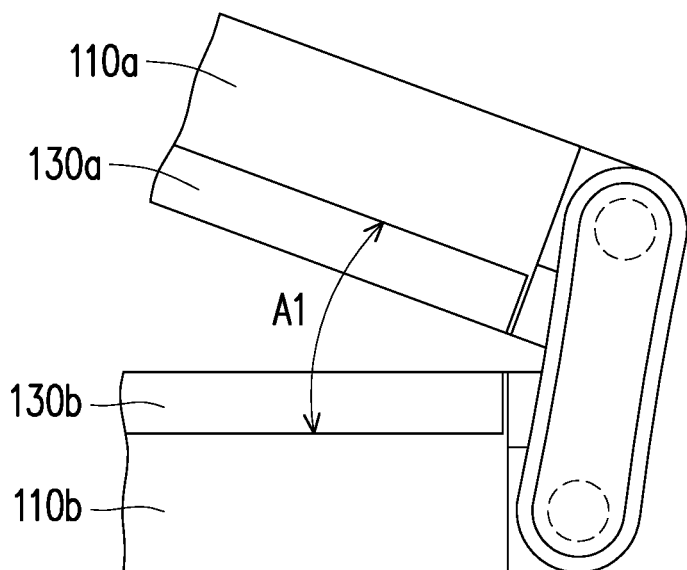

FIGS. 8A to 8G are schematic views of a flipping process of an electronic device according to another embodiment of the disclosure. When the first body 110a and the second body 110b are expanded relative to each other from a folded state as shown in FIG. 8A to a state as shown in FIG. 8B and have the first expansion angle A1 (20 degrees, for example), none of the first linkage structures 140a and the second linkage structures 140b (depicted in FIG. 1) drives any of the first functional assembly 130a and the second functional assembly 130b to move relative to the first body 110a and the second body 110b corresponding thereto.

Figure 8C:
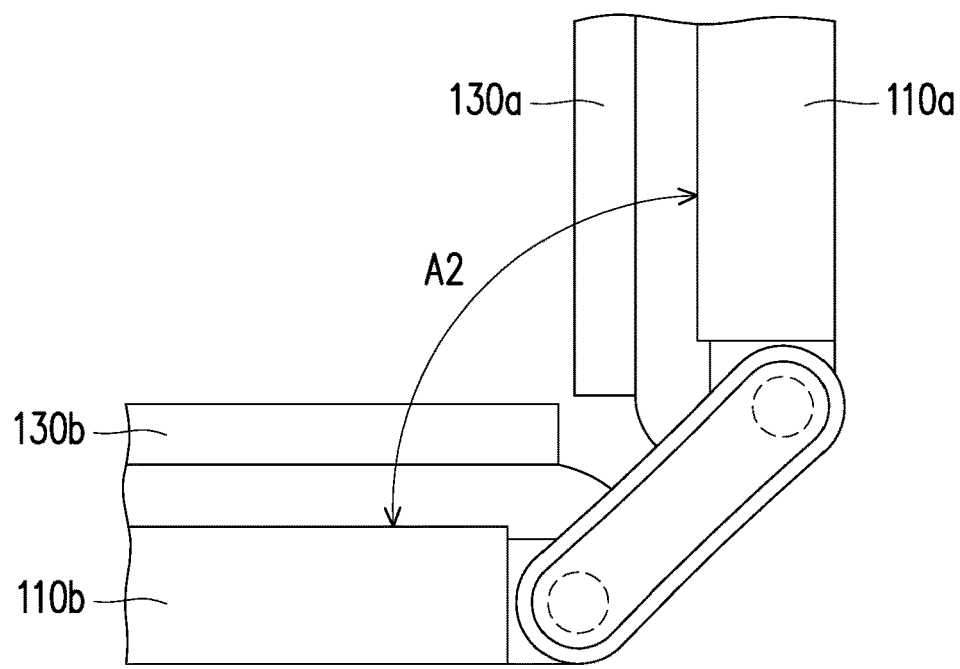

When the first body 110a and the second body 110b with the first expansion angle A1 continue to be expanded relative to each other from the state as shown in FIG. 8B to a state as shown in FIG. 8C and have the second expansion angle A2 (90 degrees, for example), each of the first linkage structures 140a and the second linkage structures 140b (depicted in FIG. 1) drives each of the first functional assembly 130a and the second functional assembly 130b to ascend and translate relative to the first body 110a and the second body 110b corresponding thereto, and the first functional assembly 130a and the second functional assembly 130b remain horizontal with the first body 110a and the second body 110b during movement, so that the edges of the first functional assembly 130a and the second functional assembly 130b move close to each other.

Figure 8D:
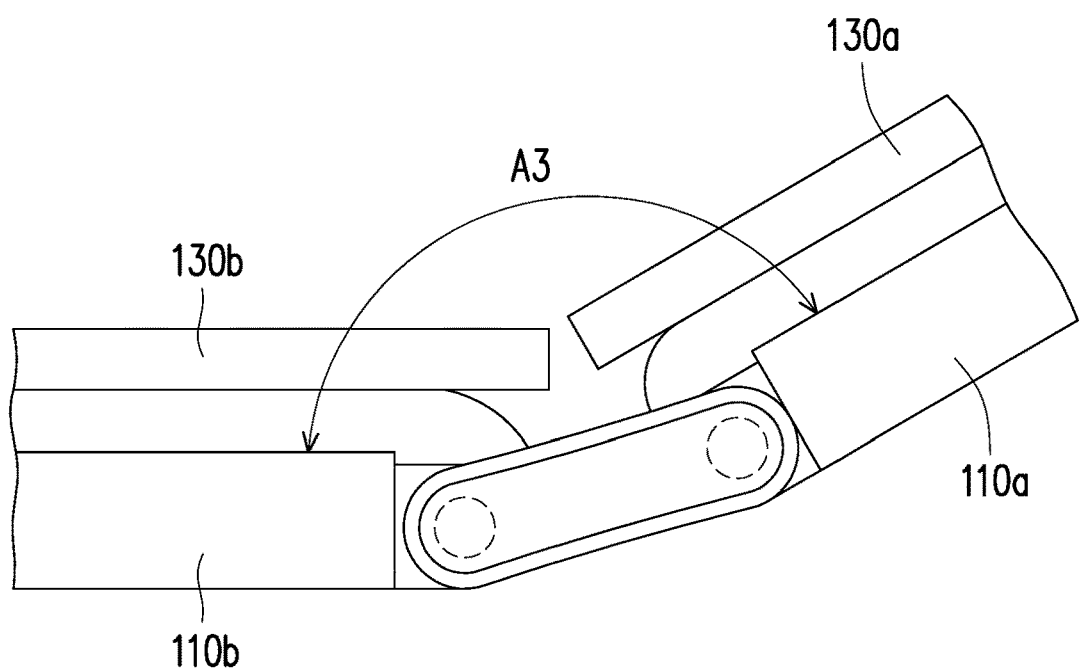

When the first body 110a and the second body 110b with the second expansion angle A2 continue to be expanded relative to each other from the state as shown in FIG. 8C to a state as shown in FIG. 8D and have the third expansion angle A3 (150 degrees, for example), each of the first linkage structures 140a and the second linkage structures 140b (depicted in FIG. 1) drives each of the first functional assembly 130a and the second functional assembly 130b to translate relative to the first body 110a and the second body 110b corresponding thereto, so that the edges of the first functional assembly 130a and the second functional assembly 130b move close to each other.

Figure 8E:
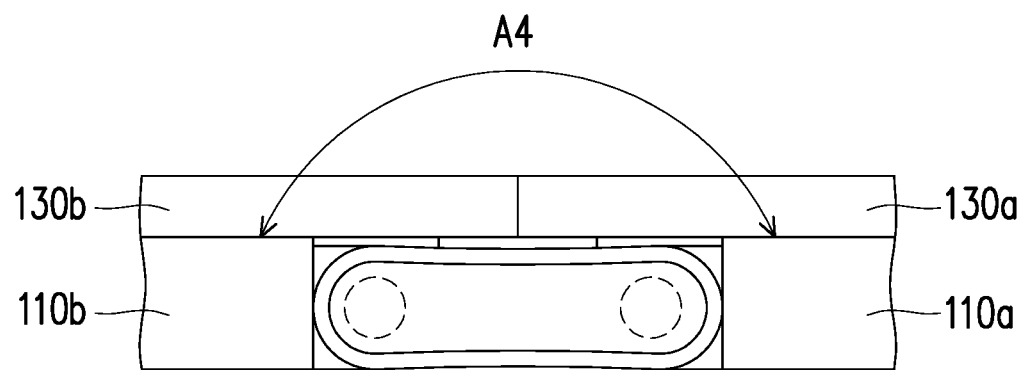

When the first body 110a and the second body 110b with the third expansion angle A3 continue to be expanded relative to each other from the state as shown in FIG. 8D to a state as shown in FIG. 8E and have the fourth expansion angle A4 (180 degrees, for example), each of the first linkage structures 140a and the second linkage structures 140b (depicted in FIG. 1) drives each of the first functional assembly 130a and the second functional assembly 130b to descend and translate relative to the first body 110a and the second body 110b corresponding thereto, so that the edges of the first functional assembly 130a and the second functional assembly 130b abut each other.

Figure 8F:
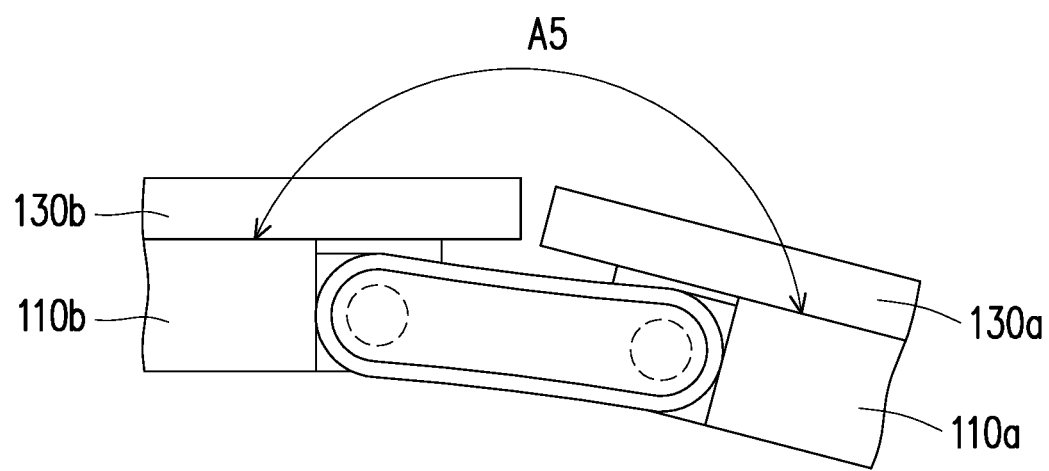

When the first body 110a and the second body 110b with the fourth expansion angle A4 continue to be expanded relative to each other from the state as shown in FIG. 8E to a state as shown in FIG. 8F and have the fifth expansion angle A5 (210 degrees, for example), each of the first linkage structures 140a and the second linkage structures 140b (depicted in FIG. 1) drives each of the first functional assembly 130a and the second functional assembly 130b to translate relative to the first body 110a and the second body 110b corresponding thereto, so that the edges of the first functional assembly 130a and the second functional assembly 130b are separated from each other.

Figure 8G:
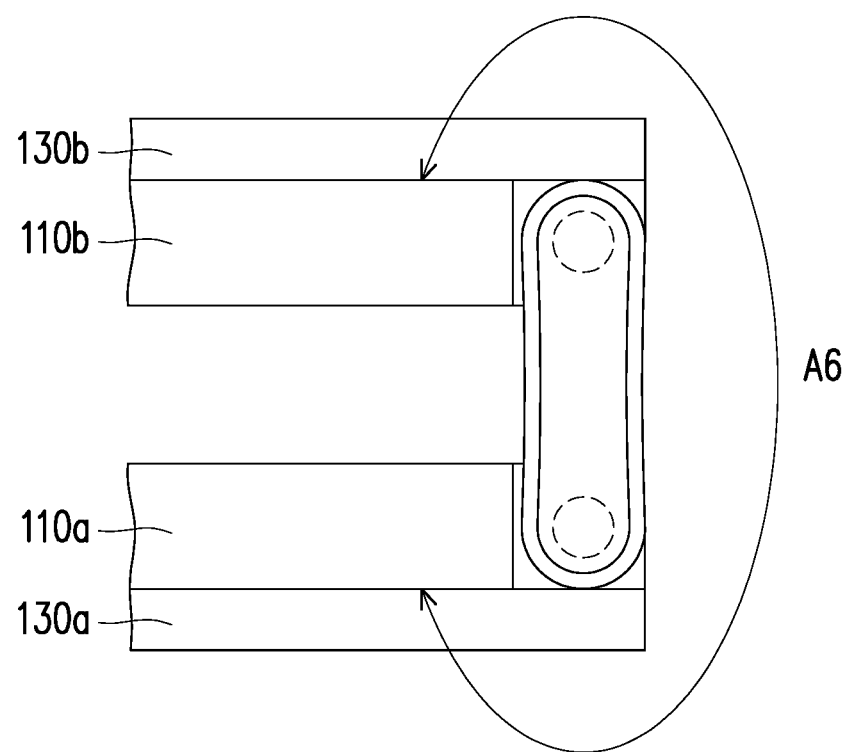

When the first body 110a and the second body 110b with the fifth expansion angle A5 continue to be expanded relative to each other from the state as shown in FIG. 8F to a state as shown in FIG. 8G and have the sixth expansion angle A6 (360 degrees, for example), none of the first linkage structures 140a and the second linkage structures 140b (depicted in FIG. 1) drives any of the first functional assembly 130a and the second functional assembly 130b to move relative to the first body 110a and the second body 110b corresponding thereto.

When the first body 110a and the second body 110b with the sixth expansion angle A6 are folded relative to each other from the state as shown in FIG. 8G to the state as shown in FIG. 8A, the first functional assembly 130a and the second functional assembly 130b are guided by the crossing slot T to slip and be restored to their original positions. By designing the shape of the crossing slot T, the timing and height of ascending and descending of the first functional assembly 130a and the second functional assembly 130b may be changed accordingly. In other embodiments, the first functional assembly 130a and the second functional assembly 130b may, for example, move to a specific position, or may asynchronously move and be restored to their original positions. Alternatively, only a single body may include a linkage structure so that only a single functional assembly is moved and restored to its original position. The disclosure is not limited thereto.

In the following embodiments, the same reference numerals as those of the above embodiments and portions of the description of the above embodiments are applicable, in which the same reference numerals are used to denote the same or similar elements, and the description of the same technical content is omitted. For the description of the omitted part, reference may be made to the above embodiments, and details are not described in the following embodiments.

Figure 9A:
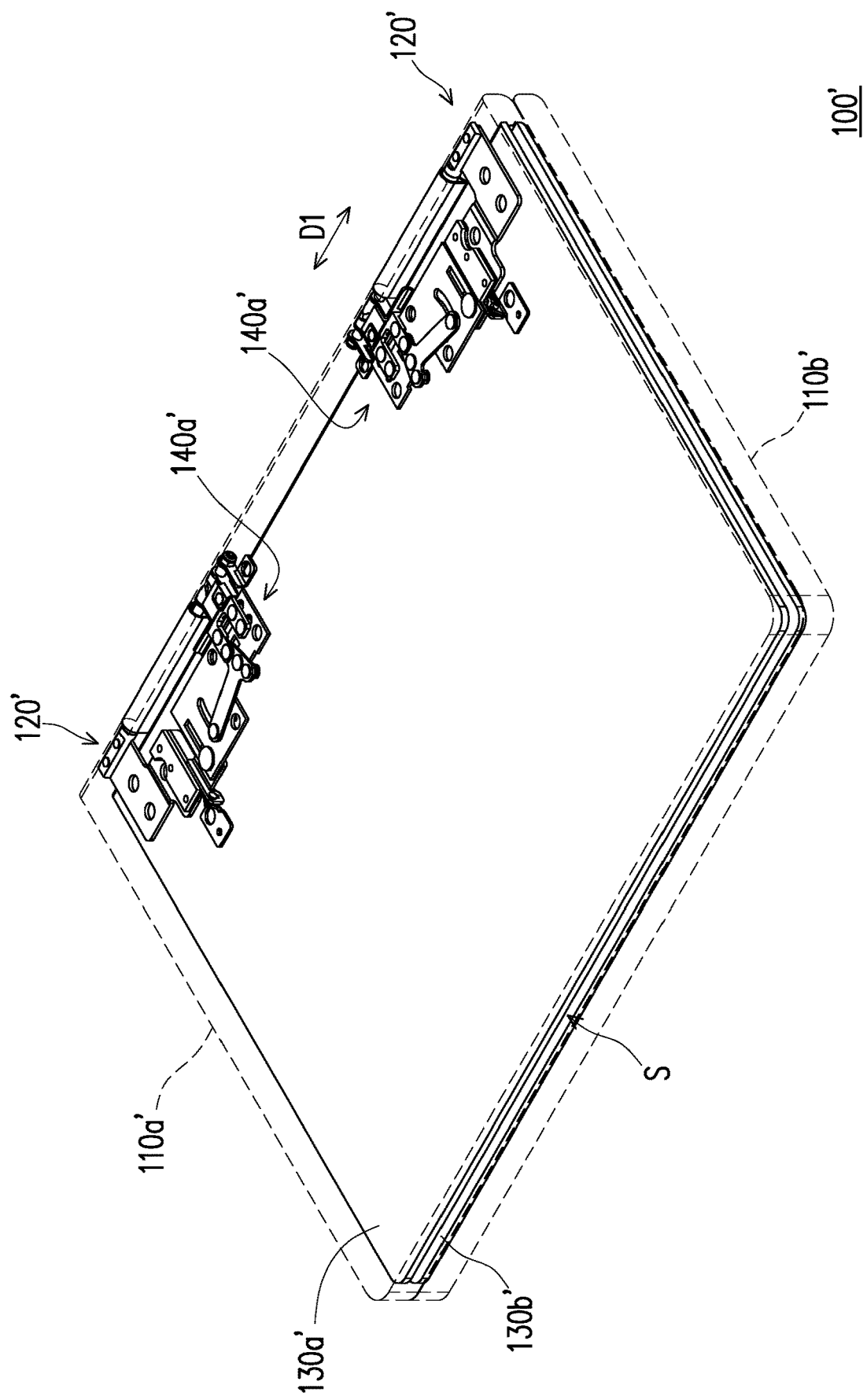
FIG. 9A is a perspective view of an electronic device according to other embodiments of the disclosure.
Figure 9B:
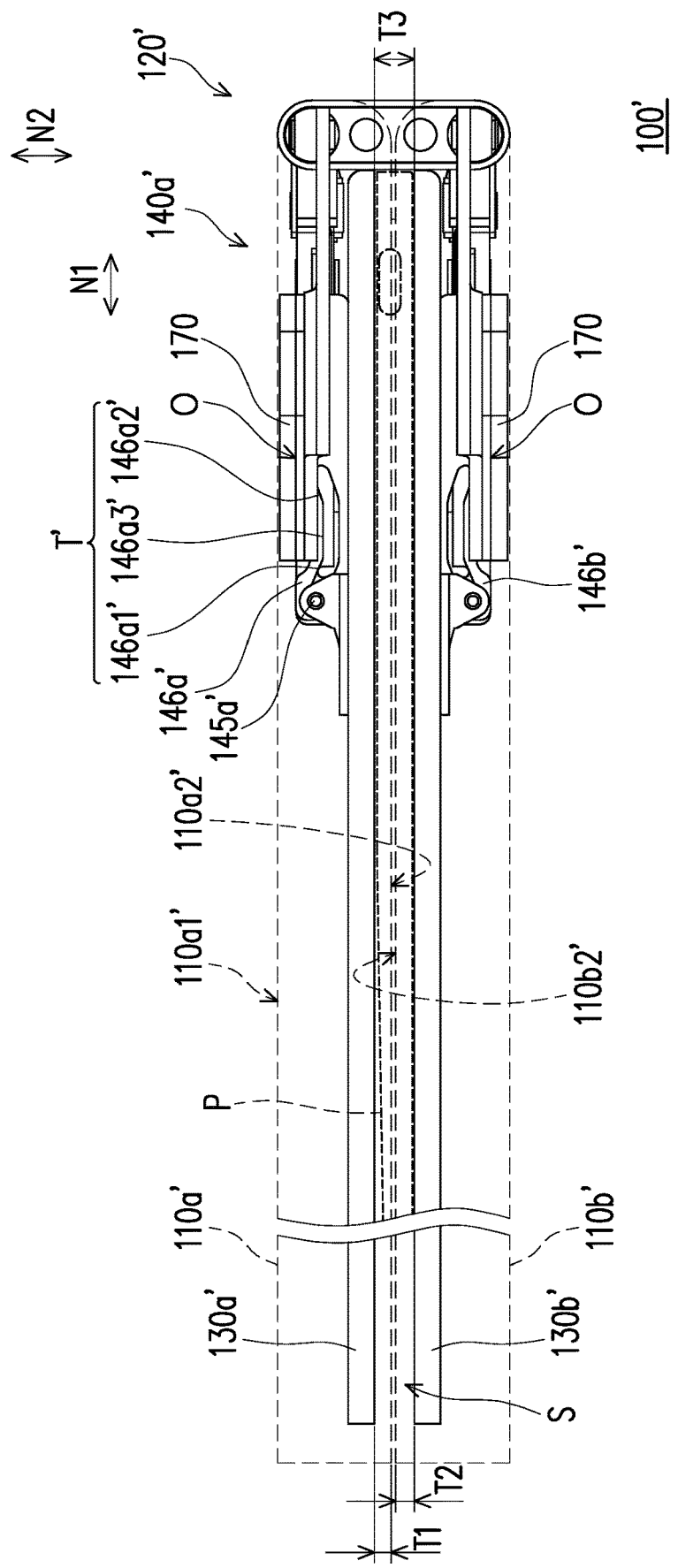
FIG. 9B is a side view of the electronic device of FIG. 9A.
Figure 9C:
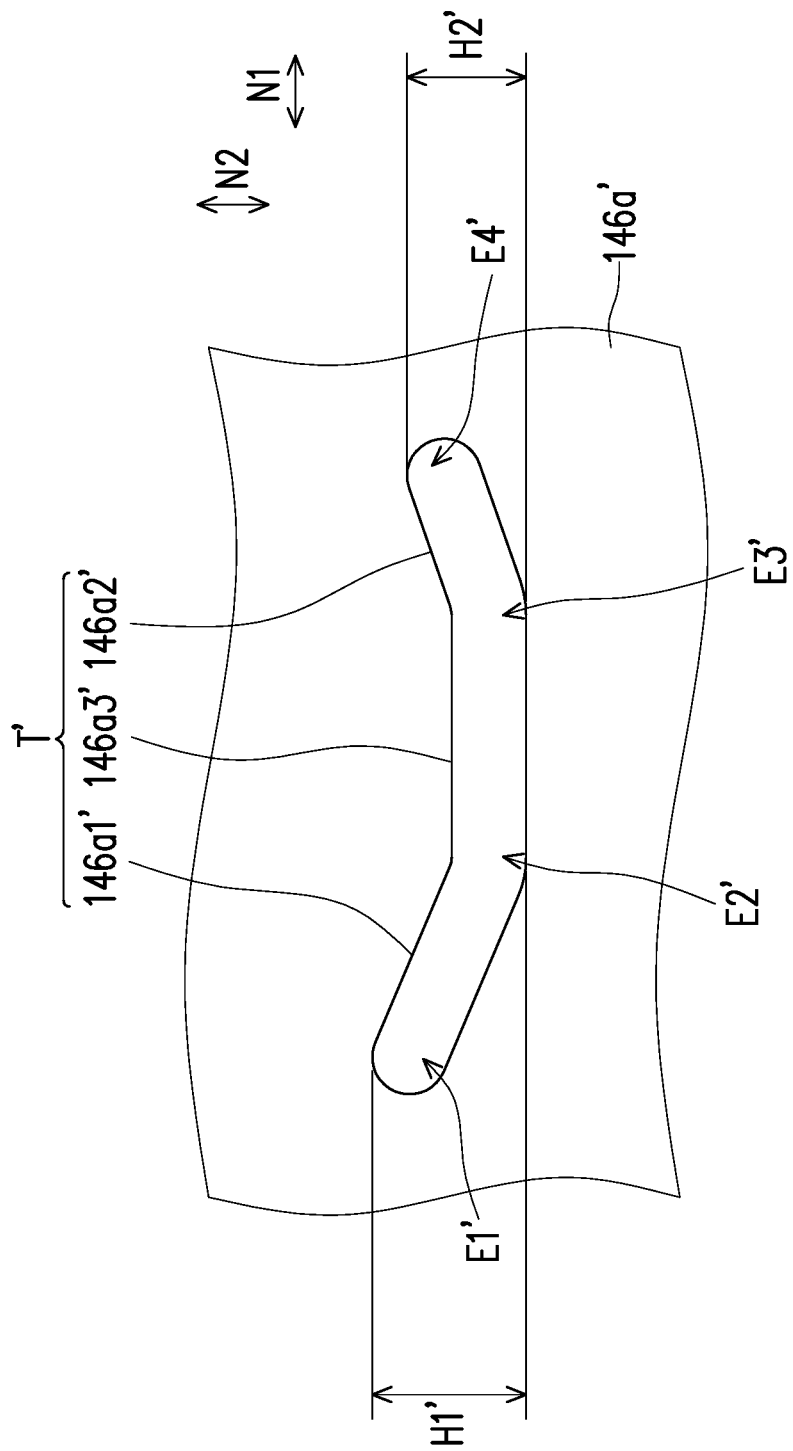
FIG. 9C is a schematic enlarged view of a guidance part of FIG. 9B.

FIG. 9A is a perspective view of an electronic device according to other embodiments of the disclosure. FIG. 9B is a side view of the electronic device of FIG. 9A. FIG. 9C is a schematic enlarged view of a guidance part of FIG. 9B. Referring to FIGS. 9A to 9C, an electronic device 100' of this embodiment includes a first body 110a', a second body 110b', at least one hinge structure 120' (two are depicted), and at least one first linkage structure 140a' (two are depicted). The first body 110a' and the second body 110b' are pivotally connected to each other by the hinge structure 120'.

The electronic device 100' of this embodiment is slightly different from the electronic device 100 of FIG. 1 in that, when the first body 110a' and the second body 110b' are folded relative to each other, a first functional assembly 130a' and a second functional assembly 130b' are adapted for being stacked in a parallel manner to form an accommodating space S between the first functional assembly 130a' and the second functional assembly 130b'. As shown in FIG. 9B, the accommodating space S selectively accommodates an external device P. In the above configuration, a user may place the additional input/output device P in the accommodating space S for ease of portability. In this embodiment, the input/output device P is, for example, a keyboard. In this way, convenience for the user is improved since there is no need to carry an additional keyboard, and the amount and weight of the user's belongings can be reduced since there is no need to carry an accessory (such as an anti-collision bag) for protecting the keyboard. In other embodiments, the input/output device P is, for example, a stylus, earphones, a microphone, or a touch pad. The disclosure is not limited thereto.

In this embodiment, a guidance part 146a' has an outer side O away from the first functional assembly 130a'. The electronic device 100' further includes a flexible unit 170. The flexible unit 170 is arranged on the outer side O of the guidance part 146a' to correspond to the guidance part 146a'. In short, the flexible unit 170 is arranged below the first functional assembly 130a', and may provide the first functional assembly 130a' with an upward pre-pressure. Similarly, the flexible unit 170 may also be arranged on an outer side of a guidance part 146b'. The outline of the flexible unit 170 of this embodiment corresponds to the outline of the outer side O of the guidance part 146a'. However in other embodiments, the shape of the flexible unit 170 may vary according to actual needs. The disclosure is not limited thereto. The flexible unit 170 is composed of, for example, foamed plastic, rubber, a spring, or other compressible material. The disclosure is not limited thereto.

Therefore, when the keyboard (that is, the input/output device P) is placed in the accommodating space S, the flexible unit 170 may be used as a buffer that absorbs external force. For example, the flexible unit 170 may absorb a force generated by the keyboard pressing against a functional assembly (the first functional assembly 130a' or the second functional assembly 130b', for example) due to external oscillation. In addition, when the user expands the first body 110a' and the second body 110b', and places the keyboard on the first functional assembly 130a' (or the second functional assembly 130b') to operate the keyboard, a force of the user pressing the keyboard pushes against the first functional assembly 130a' (or the second functional assembly 130b'). At this time, the flexible unit 170 may absorb the downward force and prevent the first functional assembly 130a' (or the second functional assembly 130b') that receives the force from directly colliding with the components therebelow. In other embodiments, the number of the flexible unit 170 may be one or two or more. The disclosure is not limited thereto.

A first inclined segment 146a1' and a second inclined segment 146a2' of a crossing slot T' on the guidance part 146a' of this embodiment respectively have a first height H1' and a second height H2' in the second direction N2. The first height H1' is greater than the second height H2'. In other words, a first end E1' is closer to an outer surface 110a1' of the first body 110a' than a fourth end E4'. When the first body 110a' and the second body 110b' are folded relative to each other, a sliding unit 145a' of the first linkage structure 140a' is located at the first end E1'. When the first body 110a' and the second body 110b' are expanded relative to each other to have an angle of 180 degrees, the sliding unit 145a' is located at the fourth end E4'. Therefore, a depth to which the first functional assembly 130a' descends relative to the first body 110a' when the first body 110a' and the second body 110b' are folded relative to each other (to have an angle of 0 degree) is greater than a depth to which the first functional assembly 130a' descends relative to the first body 110a' when the first body 110a' and the second body 110b' are expanded relative to each other to have an angle of 180 degrees.

Specifically, when the electronic device 100' is in storage, a gap T1 is formed between the inner side of the first functional assembly 130a' and an inner surface 110a2' of the first body 110a'. In this embodiment, the guidance parts 146a' and 146b' have the same design. In other words, when the electronic device 100' is in storage, the second functional assembly 130b' may also descend relative to the second body 110b', such that a gap T2 is formed between the inner side of the second functional assembly 130b' and an inner surface 110b2' of the second body 110b'. A height T3 of the accommodating space S is substantially equal to the sum of the gap T1, the gap T2 and a gap between the inner surface 110a2' of the first body 110a' and the inner surface 110b2' of the second body 110b'.

In other embodiments, the guidance parts 146a' and 146b' may have different designs so that only a single functional assembly descends relative to a corresponding body. By changing the extension manner of the crossing slot T', the timing and height of ascending and descending of the first functional assembly 130a' and the second functional assembly 130b' may be changed accordingly. The disclosure is not limited thereto.

In summary, in the electronic device of the disclosure, each linkage structure includes the sliding unit and the guidance part, in which the sliding unit is connected to the corresponding functional assembly and is slidably installed in the crossing slot of the corresponding guidance part. Each crossing slot includes the inclined segment and the horizontal segment. When the relative rotation of two bodies causes each linkage structure to be driven by the corresponding hinge structure, each sliding unit may slide in the corresponding crossing slot to drive each functional assembly to slide and ascend relative to the corresponding body, thereby reducing a gap between two functional assemblies. In addition, the two functional assemblies may cover the hinge structure, thereby improving the appearance of the electronic device.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. An electronic device comprising:
   a first body;
   a second body;
   a hinge structure, wherein the first body and the second body are pivotally connected to each other by the hinge structure;
   a first functional assembly, movably arranged on the first body; and
   a first linkage structure, connected between the hinge structure and the first functional assembly, wherein the first linkage structure is adapted for driving the first functional assembly to move relative to the first body with a relative rotation of the first body and the second body,
   wherein the first linkage structure comprises a sliding unit and a guidance part, the sliding unit is fixed to the first functional assembly and is adapted for being slidably installed on the guidance part, the guidance part has a first inclined segment, the first inclined segment has a first end and a second end opposite to each other, and the second end is closer to the hinge structure than the first end, wherein in a process of the sliding unit sliding along the first inclined segment from the first end toward the second end of the first inclined segment, the sliding unit drives the first functional assembly to slide and ascend relative to the first body.

2. The electronic device according to claim 1, wherein the guidance part has a second inclined segment, the second inclined segment has a third end and a fourth end opposite to each other, and the fourth end is closer to the hinge structure than the third end, wherein in a process of the sliding unit sliding along the second inclined segment from the third end toward the fourth end of the second inclined segment, the sliding unit drives the first functional assembly to slide and descend relative to the first body.

3. The electronic device according to claim 2, wherein the guidance part has a horizontal segment, and the horizontal segment is connected between the second end and the third end and is parallel to a display surface of the first functional assembly, wherein in a process of the sliding unit sliding along the horizontal segment, the sliding unit drives the first functional assembly to slip horizontally relative to the first body.

4. The electronic device according to claim 3, wherein the first inclined segment and the second inclined segment are symmetrically arranged at two ends of the horizontal segment.

5. The electronic device according to claim 3, wherein in the processes of the sliding unit sliding along the first inclined segment, the horizontal segment, and the second inclined segment, the first functional assembly moves close to or away from the hinge structure in a first direction perpendicular to an axis direction of the hinge structure and parallel to the display surface of the first functional assembly, and ascends or descends relative to the first body in a second direction perpendicular to the first direction and perpendicular to the display surface of the first functional assembly.

6. The electronic device according to claim 5, wherein the first inclined segment and the second inclined segment are of the same length in the second direction.

7. The electronic device according to claim 1, wherein the first functional assembly has a front end and a rear end opposite to each other, when the first body is folded relative to the second body, a distance between the rear end and the hinge structure is less than a distance between the front end and the hinge structure, the first linkage structure corresponds to the rear end, and with the relative rotation of the first body and the second body, the rear end is adapted for forming an angle with respect to the first body.

8. The electronic device according to claim 1, wherein the first body comprises a guidance structure therein, the guidance structure has an inclined segment and corresponds to a front end of the first functional assembly, the first linkage structure corresponds to a rear end of the first functional assembly, and the first linkage structure and the guidance structure are adapted for driving the first functional assembly to remain horizontal with the first body while moving with the relative rotation of the first body and the second body.

9. The electronic device according to claim 5, wherein the hinge structure comprises a first shaft and a second shaft, the first shaft is connected to the first body and has a guidance slot, the second shaft is connected to the second body, and the first linkage structure is adapted for being driven by the guidance slot.

10. The electronic device according to claim 9, wherein the first linkage structure comprises a convex part slidably installed in the guidance slot, when the first body is expanded relative to the second body at an expansion angle smaller than a predetermined angle, the guidance slot does not push against the convex part, and when the first body is expanded relative to the second body at an expansion angle not smaller than the predetermined angle, the guidance slot pushes against the convex part to be adapted for driving the sliding unit to slide in the guidance part.

11. The electronic device according to claim 1, further comprising a second functional assembly and a second linkage structure, the second functional assembly is movably arranged on the second body, and the second linkage structure is connected between the hinge structure and the second functional assembly, wherein the second linkage structure is adapted for driving the second functional assembly to slide and ascend relative to the second body with the relative rotation of the first body and the second body, such that the first functional assembly and the second functional assembly abut each other.

12. The electronic device according to claim 11, wherein when the first body and the second body are folded relative to each other, the first functional assembly and the second functional assembly are adapted for being stacked in a parallel manner to form an accommodating space between the first functional assembly and the second functional assembly, and the accommodating space selectively accommodates an external device.

13. The electronic device according to claim 1, wherein the guidance part has an outer side away from the first functional assembly, and the electronic device further comprises a flexible unit arranged on the outer side of the guidance part.

14. The electronic device according to claim 5, wherein the first inclined segment and the second inclined segment respectively have a first height and a second height in the second direction, wherein the first height is greater than the second height.

* * * * *